US012160895B2

(12) United States Patent
Chien

(10) Patent No.: US 12,160,895 B2
(45) Date of Patent: Dec. 3, 2024

(54) RADIO ACCESS METHOD, USER EQUIPMENT, AND BASE STATION

(71) Applicant: Purplevine Innovation Company Limited, Hong Kong (CN)

(72) Inventor: Chun-Che Chien, Hong Kong (CN)

(73) Assignee: Purplevine Innovation Company Limited, Hong Kong (CN)

(\*) Notice: Subject to any disclaimer, the term of this patent is extended or adjusted under 35 U.S.C. 154(b) by 364 days.

(21) Appl. No.: 17/640,394

(22) PCT Filed: Aug. 3, 2021

(86) PCT No.: PCT/CN2021/110378
§ 371 (c)(1),
(2) Date: Mar. 4, 2022

(87) PCT Pub. No.: WO2022/028432
PCT Pub. Date: Feb. 10, 2022

(65) Prior Publication Data
US 2022/0377798 A1   Nov. 24, 2022

Related U.S. Application Data

(60) Provisional application No. 63/061,223, filed on Aug. 5, 2020.

(51) Int. Cl.
*H04W 74/0833* (2024.01)
*H04L 1/1812* (2023.01)
*H04W 48/10* (2009.01)
*H04W 76/18* (2018.01)

(52) U.S. Cl.
CPC ....... *H04W 74/0833* (2013.01); *H04L 1/1812* (2013.01); *H04W 48/10* (2013.01); *H04W 76/18* (2018.02)

(58) Field of Classification Search
None
See application file for complete search history.

(56) References Cited

U.S. PATENT DOCUMENTS

2013/0203399 A1\* 8/2013 Gupta .................. H04W 28/12
455/418
2016/0353440 A1\* 12/2016 Lee .................. H04W 72/0453
2017/0164411 A1   6/2017 Choi et al.
(Continued)

FOREIGN PATENT DOCUMENTS

CN       110225598       9/2019
CN       111294787       6/2020

OTHER PUBLICATIONS

International Search Report and the Written Opinion Dated Oct. 26, 2021 From the International Searching Authority Re. Application No. PCT/CN2021/11 0378 (6 Pages).
(Continued)

*Primary Examiner* — Lonnie V Sweet

(57) ABSTRACT

A user equipment (UE) executes a radio access method. The UE being an extended device type UE obtains, from a base station, connection indication information of a certain device type represented by device type related information of the extended device type UE, determines an initial access scheme based on the connection indication information, and performs an initial access procedure with the base station according to the initial access scheme.

64 Claims, 9 Drawing Sheets

(56) References Cited

U.S. PATENT DOCUMENTS

| | | |
|---|---|---|
| 2020/0008188 A1 | 1/2020 | Nam et al. |
| 2022/0377532 A1* | 11/2022 | He ........................ H04W 48/18 |
| 2022/0418001 A1 | 12/2022 | Chien |
| 2023/0140310 A1* | 5/2023 | Koskinen .............. H04L 5/0048 |
| | | 370/329 |
| 2023/0217498 A1* | 7/2023 | Lee ................... H04W 74/0833 |
| | | 370/329 |
| 2023/0300786 A1* | 9/2023 | Zhang ................... H04W 72/51 |
| | | 455/458 |
| 2024/0031909 A1* | 1/2024 | Yue ....................... H04W 48/08 |

OTHER PUBLICATIONS

Intel Corporation "Channel Structure for 2-Step RACH", Xi'an, China: 1-11, Apr. 8-12, 2019.

* cited by examiner

RADIO ACCESS METHOD, USER EQUIPMENT, AND BASE STATION

RELATED APPLICATIONS

This application is a National. Phase of PCT Patent Application No. PCT/CN2021/110378 having International filing date of Aug. 3, 2021, which claims the benefit of priority under 35 USC § 119 (e) of U.S. Provisional Patent Application No. 63/061,223 filed on Aug. 5, 2020. The contents of the above applications are all incorporated by reference as if fully set forth herein in their entirety.

FIELD AND BACKGROUND OF THE INVENTION

The present disclosure relates to the field of communication systems, and more particularly, to a radio access method, a user equipment, a base station.

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated, the RAN and CN each conducts respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

Reduced capability (RedCap) devices are an extended type of NR device that can be applied to industrial wireless sensor network (IWSN), smart city, and wearable use cases. The requirements for IWSN services are higher than Low-Power Wide-Area Network (LPWAN), such as LTE-M or narrow band internet of things (NB-IoT), but lower than ultra-reliable and low latency communication (URLLC) and enhanced mobile broadband (eMBB). Detail and specific requirements for different use cases are illustrated in 3GPP TR 22.804, TS 22.104, TR 22.832 and TS 22.261

To support RedCap NR devices, the following technical problem have been identified:
  How to define and constrain such reduced capabilities—considering definition of a limited set of one or more device types and considering how to ensure those device types are only used for the intended use cases.
  How to define a functionality that allows devices with reduced capabilities to be explicitly identifiable to networks and network operators, and allows operators to restrict access from the RedCap NR devices, if desired.

SUMMARY OF THE INVENTION

An object of the present disclosure is to propose a radio access method, a user equipment, and a base station.

In a first aspect, an embodiment of the invention provides a radio access method executable in a base station, comprising:
providing connection indication information of a certain device type represented by device type related information of an extended device type user equipment (UE); and
performing an initial access procedure with the extended device type UE according to an initial access scheme of the extended device type UE.

In a second aspect, an embodiment of the invention provides a radio access method executable in a user equipment (UE), comprising:
obtaining, from a base station, connection indication information of a certain device type represented by device type related information of the extended device type UE; and
determining an initial access scheme based on the connection indication information; and performing an initial access procedure with the base station according to the initial access scheme.

In a fifth aspect, an embodiment of the invention provides a base station comprising a processor configured to call and run a computer program stored in a memory, to cause a device in which the chip is installed to execute the disclosed method.

In a sixth aspect, an embodiment of the invention provides a user equipment (UE) comprising a processor configured to call and run a computer program stored in a memory, to cause a device in which the chip is installed to execute the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as a computer program product, that causes a computer to execute the disclosed method.

The disclosed method may be programmed as a computer program, that causes a computer to execute the disclosed method.

The disclosed method provides:
  Mechanisms to define RedCap UE type(s).
  Mechanisms to restrict RedCap UEs within intended use cases when accessing a telecommunication network: Thus, performance degradation resulted from RedCap UE working over eMBB service can be avoided.
  Identification of RedCap UE type devices: The feature provides technical effects to avoid unnecessary network access attempt of the RedCap UEs, reduce UE power consumption, and balance network load. For example, the network can distinguish RedCap UE and performs relaxed scheduling and DL/UL data transmission during cell access and random-access procedure for RedCap UEs.

Cell-specific resources for RedCap UEs including:
a) Initial access resource;
b) Paging resource; and/or
c) System information block (SIB) with index one (SIB1) or other system information (OSI).

An embodiment of the invention provides RedCap UE identification based on various UE identification schemes during an initial access stage. An embodiment of the invention provides RedCap UE identification based on various UE ID provision schemes during RRC_IDLE and RRC_CONNECTED state. An embodiment of the invention provides restricted access based on RedCap UE specific cell barring and access control. An embodiment of the invention provides initial access resource management for RedCap UEs. An embodiment of the invention provides initial DL or UL bandwidth part (BWP) adjustment for RedCap UEs.

An embodiment of the invention provides advantageous effects of maintaining coexistence performance for NR RedCap UEs and NR legacy UEs. An embodiment of the invention allows operators to restrict NR RedCap UE's access, ensure NR RedCap UE types are only used for the intended use cases, and reduce NR RedCap UE power consumption due to unnecessary cell access. In an embodiment of the invention, the network can distinguish RedCap UE from non-RedCap UE and performs relaxed scheduling and DL/UL data transmission during cell access and random-access procedure for RedCap UEs.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field may obtain other figures according to these figures without paying the premise.

DESCRIPTION OF SPECIFIC EMBODIMENTS OF THE INVENTION

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Device types in the description may comprise various UE types, such as a legacy UE type and non-legacy UE types. The non-legacy UE types may be referred to as extended UE types and may comprise the reduced capability (RedCap) UE type or any of other device types. Examples of other device types comprise UE of narrow band internet of things (NB-IoT), machine type communication (MTC), or low-power wide area network (LPWAN).

Figure 1:
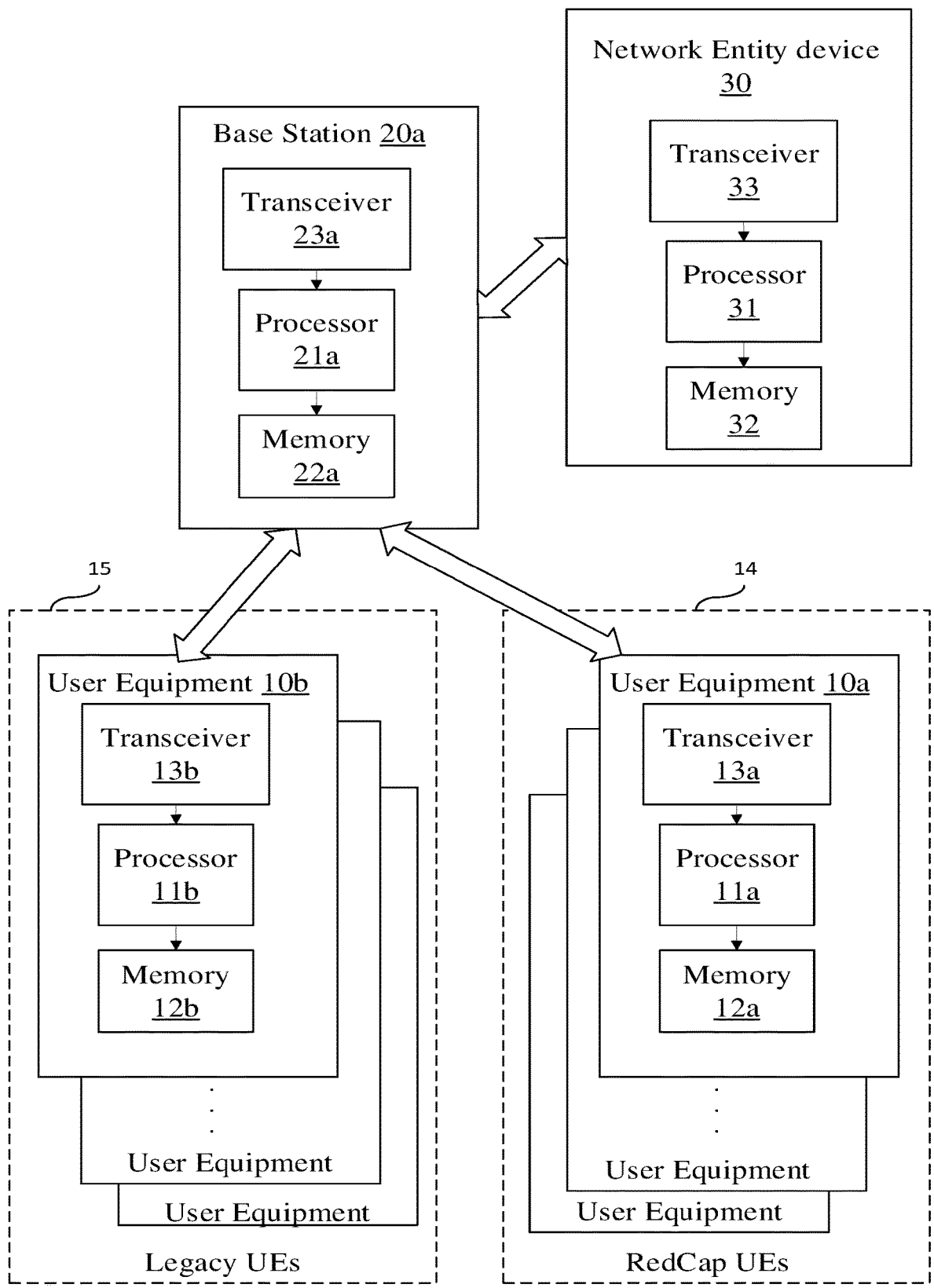
FIG. 1 illustrates a schematic view of a telecommunication system.

With reference to FIG. 1, a telecommunication system including a UE 10a, a UE 10b, a base station (BS) 20a, and a network entity device 30 executes the disclosed method according to an embodiment of the present disclosure. FIG. 1 is shown for illustrative not limiting, and the system may comprise more UEs, BSs, and CN entities. Connections between devices and device components are shown as lines and arrows in the FIGS. The UE 10a may include a processor 11a, a memory 12a, and a transceiver 13a. The UE 10b may include a processor 11b, a memory 12b, and a transceiver 13b. The base station 20a may include a processor 21a, a memory 22a, and a transceiver 23a. The network entity device 30 may include a processor 31, a memory 32, and a transceiver 33. Each of the processors 11a, 11b, 21a, and 31 may be configured to implement proposed functions, procedures and/or methods described in the description. Layers of radio interface protocol may be implemented in the processors 11a, 11b, 21a, and 31. Each of the memory 12a, 12b, 22a, and 32 operatively stores a variety of programs and information to operate a connected processor. Each of the transceivers 13a, 13b, 23a, and 33 is operatively coupled with a connected processor, transmits and/or receives radio signals or wireline signals. The base station 20a may be an eNB, a gNB, or one of other types of radio nodes, and may configure radio resources for the UE 10a and UE 10b. The telecommunication system comprises a plurality of UEs belong to an extended UE type in group 14 and a plurality of UEs belong to a legacy UE type in group 15. UEs belong to the extended UE type in group 14 comprise UE 10a, and UEs belong to the legacy UE type in group 15 comprise UE10b.

Each of the processors 11a, 11b, 21a, and 31 may include an application-specific integrated circuit (ASICs), other chipsets, logic circuits and/or data processing devices. Each of the memory 12a, 12b, 22a, and 32 may include read-only memory (ROM), a random access memory (RAM), a flash memory, a memory card, a storage medium and/or other storage devices. Each of the transceivers 13a, 13b, 23a, and 33 may include baseband circuitry and radio frequency (RF) circuitry to process radio frequency signals. When the embodiments are implemented in software, the techniques described herein can be implemented with modules, procedures, functions, entities, and so on, that perform the functions described herein. The modules can be stored in a memory and executed by the processors. The memory can be implemented within a processor or external to the processor, in which those can be communicatively coupled to the processor via various means are known in the art.

The network entity device 30 may be a CN node, i.e., a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

Figure 2:
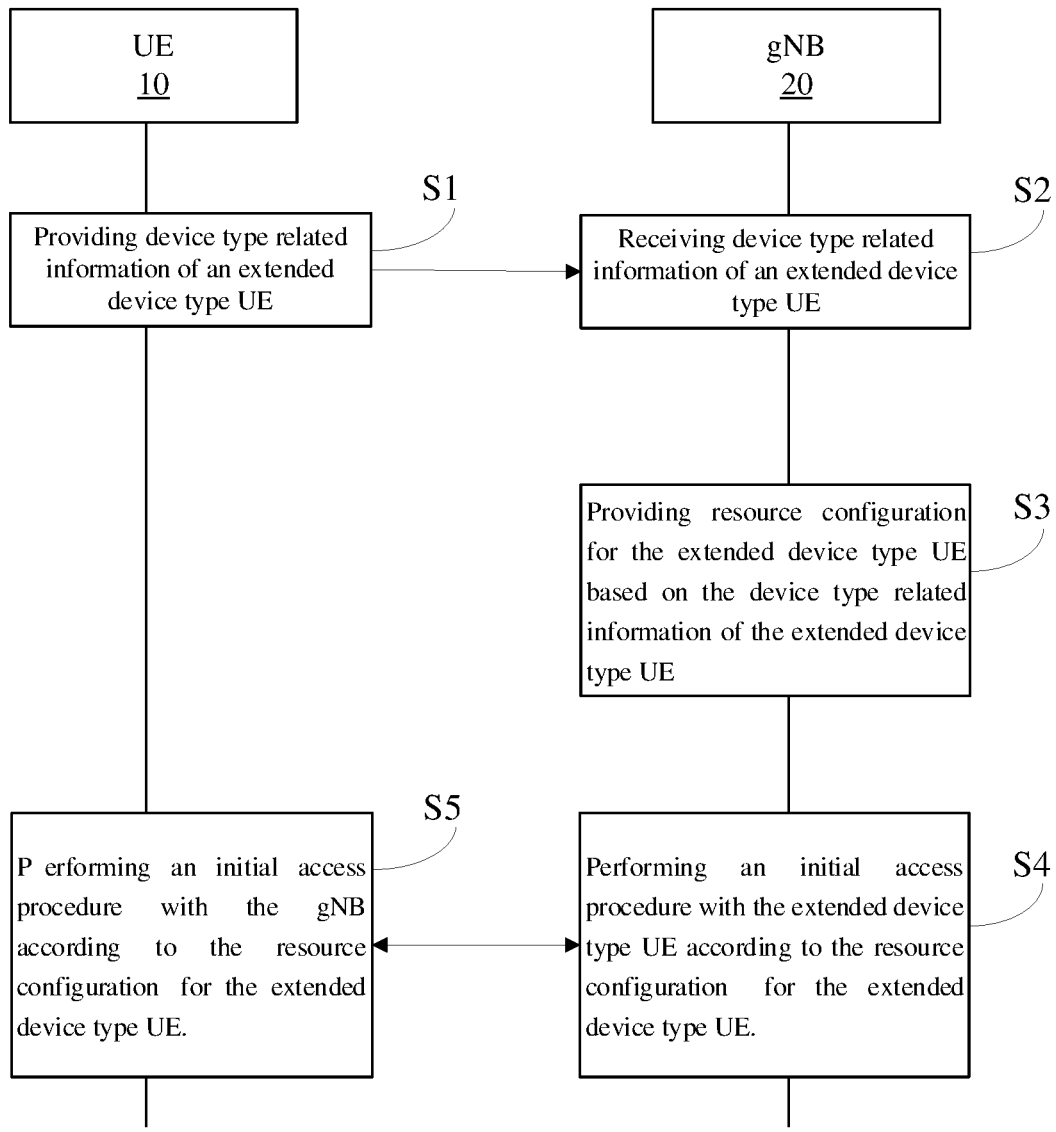
FIG. 2 illustrates a schematic view showing an embodiment of a radio access method for an extended device type UE.

With reference to FIG. 2, a radio access method for extended user equipment (UE) type is executable in a base station (BS), such as a gNB 20, and an extended device type UE, such as UE 10. An example of the extended UE type may comprise a device type of reduced capability (RedCap) UE. The device type of RedCap UE type may be referred to as RedCap UE. The legacy UE type may be referred to as legacy UE. An example of the gNB 20 may comprise the BS 20a. An example of the UE 10 may comprise the RedCap UE 10a. Note that even though the gNB is described as an example of base station in the following, the radio access method of the disclose may be implemented in any other types of base stations, such as an eNB or a base station for beyond 5G. Examples of UEs of the extended UE type may comprise RedCap UEs, such as UE 10a. An example of the UE in the description may include one of the UE 10a or UE 10b. Uplink (UL) transmission of a control signal or data may be a transmission operation from a UE to a base station. Downlink (DL) transmission of a control signal or data may be a transmission operation from a base station to a UE.

The UE provides device type related information of an extended device type UE (S1). The gNB receives device type related information of an extended device type UE (S2) and provides resource configuration for the extended device type UE based on the device type related information of the extended device type UE (S3). The gNB performs an initial access procedure with the extended device type UE according to the resource configuration for the extended device type UE (S4). The UE performs an initial access procedure with the gNB according to the resource configuration for the extended device type UE (S5).

The extended device type UE comprises a reduced capability user equipment (RedCap UE). The device type related information may explicitly comprise a UE identity, a device type, or a UE capability of the extended device type UE. The device type related information may comprise a predefined preamble, predefined physical random access channel (PRACH) resources, a predefined initial DL or UL BWP for the extended device type UE, so that the extended device type UE can implicitly signal the device type or UE capability to the network, and the network can identify the device type or UE capability of the extended device type UE based on the device type related information. The device type may be determined based on a newly defined UE type or UE category different from a legacy UE. The device type may be determined based on at least one of newly defined UE capability different from a legacy UE. The device type may be determined based on a set of UE capability parameters used for a legacy UE.

An embodiment of an extended device type may comprise a RedCap UE type, and an embodiment of a UE of the extended device type may comprise a RedCap UE of the RedCap UE type. The extended device type, such as the RedCap UE type, may be defined in a telecommunication network using a new UE type (i.e., a new UE category) or a new set of UE capabilities. The telecommunication network may be a 3GPP compatible network. In the description, the telecommunication network is referred to as the network and may comprise a RAN and a CN, at least one of the RAN or the CN, or at least one of the base station 20a or the network entity device 30. Embodiments of the network processing the extended device type, such as the RedCap UE, represented by the new UE type and the new set of UE capabilities are detailed in the following:

Option 1: To define the extended device type, such as the RedCap UE type, as a new UE type or a new UE category:

For example, two or more new UE types may be defined for the RedCap UE type of RedCap UEs. In an embodiment, one RedCap UE type comprises a device type of lower complexity RedCap UE. One or more lower complexity RedCap UEs may use new initial access scheme, e.g., using a separate initial DL or UL bandwidth part (BWP) or separate radio resources for initial access different from a DL/UL BWP or radio resources for legacy NR initial access scheme. Examples and definition of the legacy NR initial access scheme are defined in TS38.213. In an embodiment, one RedCap UE type comprises a device type of higher complexity RedCap UE. One or more higher complexity RedCap UEs may use legacy initial access scheme which is the same as those for a legacy UE.

Option 2: To define the extended device type, such as the RedCap UE type, using existing NR capability framework.

The UE capability of the extended device type UE may be stored in a mobility management function (AMF), the UE transmits a UE identity of the extended device type UE associated with the device type related information in the AMF. Examples and definition of NR capabilities are defined in TS38.306. In an embodiment, the network defines one or more new capabilities dedicated to RedCap UEs in addition to existing NR capabilities, and use the new capabilities and/or a combination of the new capabilities and current NR capabilities to define the RedCap UE type for RedCap UEs. In an embodiment, the network uses a UE capability combination (i.e., a special set of UE capabilities) of current NR capabilities to define the RedCap UE type for RedCap UEs. Note that the network can associate a RedCap UE type with a UE capability.

Embodiment 0-1

Figure 3:
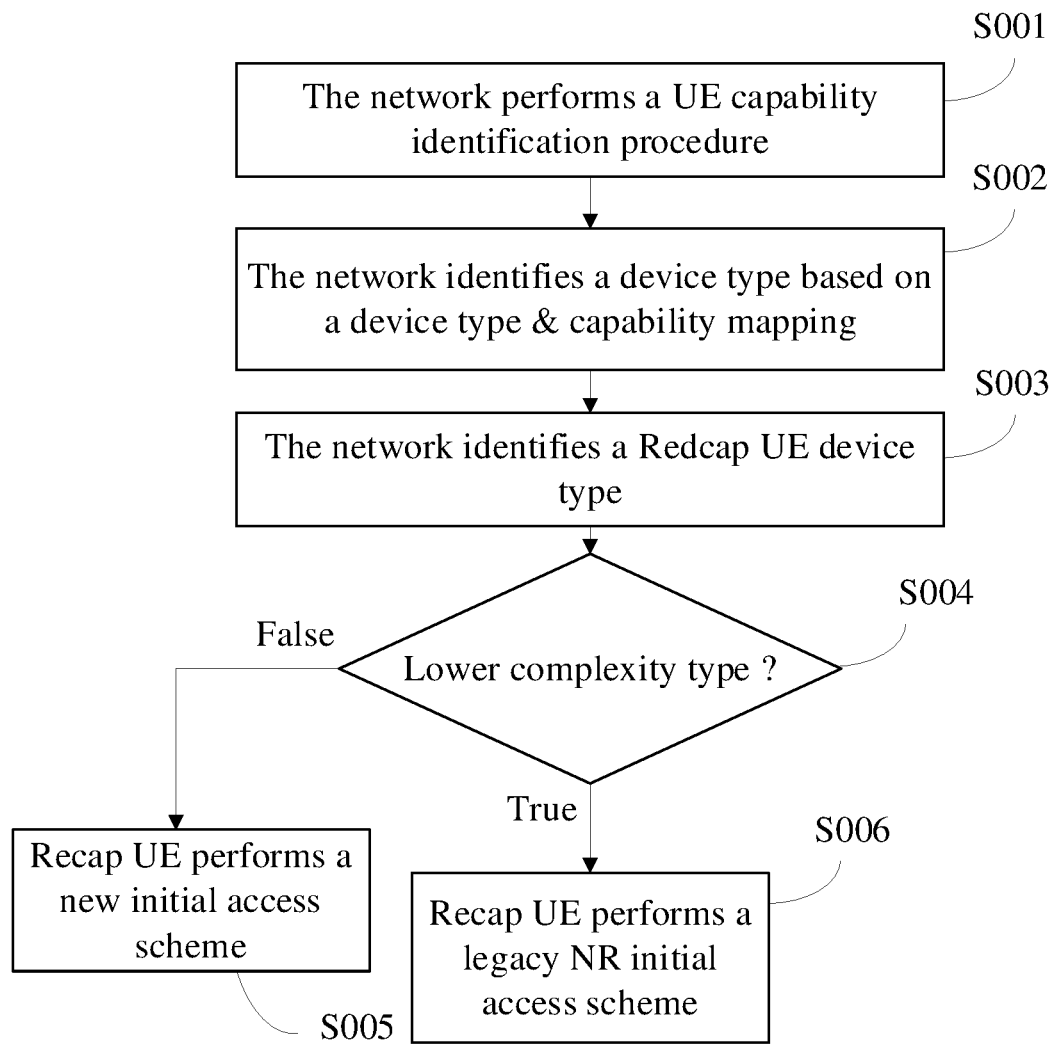
FIG. 3 illustrates a schematic view showing an embodiment of a radio access method for a RedCap UE.

With reference to FIG. 3, an embodiment of RedCap UE initial access (i.e., an initial access procedure or an radio access method for a RedCap UE) comprises the following steps.

The network performs a UE capabilities identification procedure to identify and obtain UE capabilities of the UE (S001).

The network determines a device type, such as the RedCap UE type, associated with the identified UE capabilities based on a pre-configured mapping table defined by the network (S002). The pre-configured mapping table comprises mappings between device types and UE capabilities. Each of the mappings in the pre-configured mapping table associates a device type with a set of UE capability or capabilities.

The network performs RedCap UE type identification to identify a device type of a RedCap UE if two or more device types are configured in the mapping table (S003). For example, the network determines whether the RedCap UE belongs to the device type of the lower complexity RedCap UE or the device type of the higher complexity RedCap UE.

The network determines whether the RedCap UE comprises a device type of the lower complexity RedCap UE (S004). If the RedCap UE comprises a device type of the lower complexity RedCap UE, the network determine that the RedCap UE can perform a new initial access scheme for the device type of the lower complexity RedCap UE. If the RedCap UE comprises a device type of the higher complexity RedCap UE, the network determine that the RedCap UE can perform a legacy initial access scheme for the device type of the legacy UE.

The RedCap UE performs the new initial access scheme for the device type of the lower complexity RedCap UE if the UE is identified as the device type of the lower complexity RedCap UE (S005)

The RedCap UE performs the initial access scheme the same as the legacy UE if the UE is not identified as the device type of the lower complexity RedCap UE, e.g., the UE is identified as the device type of the higher complexity RedCap UE (S006).

Figure 4:
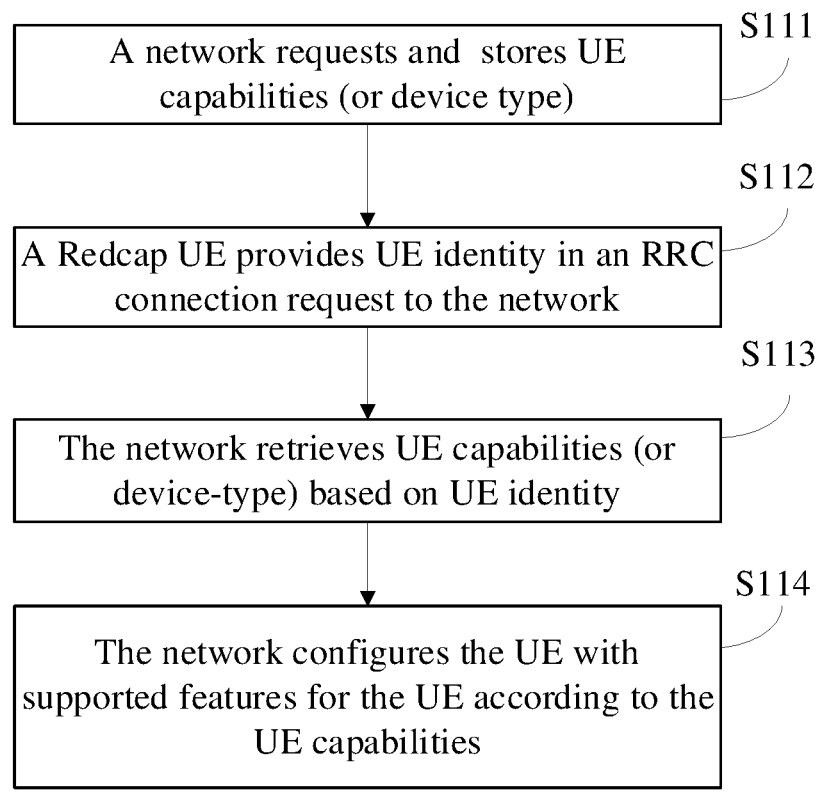
FIG. 4 illustrates a schematic view showing an embodiment of the disclosed method with RedCap UE identification and configuration.

Embodiment 1-1: Signaling of Device Type Related Information During Network Registration With reference to FIG. 4, an embodiment of the disclosed method with RedCap UE identification and configuration is detailed in the following. The device type related information may be included in an RRC connection request Step 1: During network registration, the network requests or derives UE capabilities (or device-type) and stores the UE capabilities (or device type) in the AMF, assigned an identity to the UE, referred to a UE identity, and associates the UE capabilities (or device type) with the UE identity assigned to the UE according to a corresponding device type mapping (S111). Examples of the UE identity may comprise radio network temporary identifier (RNTI) or international mobile subscriber identification number (IMSI).

Step 2: When a non-access stratum (NAS) connection is established between the UE and the AMF, the UE provides the UE identity of the UE in an RRC connection request to the network (S112). The base station receives the UE identity of the UE in an RRC connection request.

Step 3: The base station retrieves the UE capabilities (or device-type) from the AMF based on the UE identity (S113).

Step 4: Upon retrieving the UE capabilities, such as a full set of UE capabilities (or device-type) of the UE, the base station configures the UE with supported features for the UE according to the UE capabilities (or device-type) of the UE (S114). Examples of the UE capabilities may comprise a number of antennas or a bandwidth of the UE, or a combination thereof.

Embodiment 1-2: Signaling of Device Type Related Information in RRC_CONNECTED State When an RRC connection is established between the base station and the extended device type UE, the base station sends an inquiry for the device type related information of the extended device type UE to the extended device type UE. The UE receives the inquiry for the device type related information of the extended device type UE from the base station, and transmits to the base station the device type related information of the extended device type UE in response to the inquiry. The base station receives the device type related information of the extended device type UE in response to the inquiry. For example, when an RRC connection is established between the gNB and the RedCap UE, the gNB sends an inquiry (e.g., UEDeviceTypeEnquiry) for UE capabilities (or device-type) to the UE, and the UE sends UE capabilities (or device-type) information (e.g., UEDeviceTypeInformation) to the gNB in response to the inquiry.

Embodiment 1-3

Autonomous provision of device type related information, e.g., device type ID delivered during initial access when the UE transits from an RRC idle state (RRC_IDLE) or an RRC inactive state (RRC_INACTIVE) to an RRC connected state (RRC_CONNECTED). The device type related information may comprise a predefined preamble, predefined physical random access channel (PRACH) resources, a predefined initial DL or UL BWP for the extended device type UE, so that the extended device type UE can implicitly signal the device type or UE capability to the network, and the network can identify the device type or UE capability of the extended device type UE based on the device type related information. The UE transmits the device type related information to the base station during initial access when the extended device type UE transits from an RRC idle state or an RRC inactive state to an RRC connected state.

The UE can provide its identity and/or device type ID autonomously to the gNB using at least one of the following messages: msg1, msg3, or msgA for 2-step PRACH. Examples of the identity may comprise RNTI or IMSI.

Option 1: msg 1:
In an embodiment, the UE provides device type related information, such as a UE identity, UE capability, and/or a device type ID, of the UE autonomously in a message msg1 to the gNB. For example, the RedCap UE may implicitly provide device type related information, using a predefined preamble, predefined physical random access channel (PRACH) resources, a predefined initial DL or UL BWP. A UE (e.g., the lower complexity RedCap UE) with bandwidth less than 20 MHz may need the predefined initial DL/UL BWP for RedCap UE.

Option 2: msg 3:
In an embodiment, the UE provides device type related information, such as a UE identity, UE capability and/or a device type ID, of the UE autonomously in a message msg3 to the gNB. Examples of the user identity may comprise RNTI or IMSI. For example, RedCap UE provides RNTI value and/or device type ID to the gNB when the RedCap UE transits from the RRC_INACTIVE state or the RRC_IDLE state.

Option 3: msg 5:
In an embodiment, the UE provides device type related information, such as a UE identity, UE capability and/or a device type ID, of the UE autonomously in a message msg5 to the gNB. E.g. RedCap UE provides the identity, such as a temporary mobile subscriber identity (TMSI), a 5G-TMSI, or 5G-S-TMSI and/or device type ID when the UE is transited from the RRC_IDLE state.

Option 4: msgA for 2-step PRACH:
In an embodiment, the UE provides device type related information, such as a UE identity, UE capability and/or a device type ID, of the UE autonomously in a message msgA to the gNB. For example, the RedCap UE provides device type ID implicitly over msgA PRACH to the gNB. Alternatively, the RedCap UE provides device type ID explicitly over msgA PUSCH to the gNB. The PUSCH is known as physical uplink shared channel (PUSCH).

Embodiment 1-4

The network provides resource configuration for the extended device type UE based on the device type related information of the extended device type UE. For example, upon retrieving the device type related information of the extended device type UE, such as the UE capability or device-type of the UE, the network, such as the gNB, can perform one or more of the following operations for the RedCap UE after an RRC connection is established specifically for the RedCap UE:
  configuring the supported features of corresponding device type for the RedCap UE;
  configuring coverage enhancement related features for the RedCap UE;
  configuring access control or cell restriction for the RedCap UE;
  providing DL or UL BWP indication for the RedCap UE; and
  determining an inter-UE multiplexing scheme between the RedCap UE and legacy UE.

In providing the resource configuration, the base station performs one or more of the operations for extended device type UE based on the device type related information of the extended device type UE after an RRC connection is established for the extended device type UE. The operations are further detailed in the following:
  Configuring the supported features of corresponding device type for the RedCap UE:
  The network may configure the supported features for the UE. The supported features for the extended device type UE are associated with the device type related information of the extended device type UE during a random access procedure or after an RRC connection is established for the extended device type UE. The supported features for the UE features include one or more of:
    processing time;
    bandwidth supported;
    subcarrier spacing (SCS) supported; and
    duplex mode supported.
  The processing time capabilities of the UE comprise processing time for one or more of the following UE operations:
    physical downlink shared channel (PDSCH) decoding and HARQ-ACK feedback preparation;
    PDCCH decoding and PUSCH transmission preparation; and
    PDCCH decoding and CSI feedback preparation.
  According to the processing time capabilities of the UE, the network allocates processing time for the UE for the UE operations of PDSCH decoding and HARQ-ACK transmission, PUSCH transmission, and CSI feedback. Hybrid automatic repeat request (HARQ) feedback is referred to as HARQ-ACK and may comprise acknowledgement (ACK) or negative acknowledgement (NACK).
  Configuring coverage enhancement related features for the RedCap UE:
  The network may configure coverage enhancement related features for the UE. The coverage enhancement related features for the extended device type UE are associated with the device type related information of the extended device type UE during a random access procedure or after an RRC connection is established for the extended device type UE. The coverage enhancement related features for the UE are preconfigured or are reconfigured by an RRC message or a downlink control information (DCI) to the UE. The coverage enhancement related features include one or more of:
    repetition number of PUSCH or PUCCH transmission; and
    uplink power control of PUSCH or PUCCH transmission.
  The network, such as the gNB, may preconfigure the coverage enhancement related features, such as the repetition number and/or the uplink power control, for the UE or send an RRC message or a downlink control information (DCI) to the UE to configure the coverage enhancement related features for the UE.
  Configuring access control or cell restriction for the RedCap UE:
  The network may configure access control or cell restriction for the UE. The access control or cell restriction for the extended device type UE is associated with the device type related information of the extended device type UE in system block information for the extended device type UE. The access control or cell restriction includes one or more of:
    access identity for the RedCap UE with a specific device type;
    access category for the RedCap UE with a specific device type; and
    access priority for the RedCap UE with a specific device type.
  Based on operator policy, the network may prevent UEs, such as the RedCap UE and/or the legacy UE, from accessing the network using relevant barring parameters that vary depending on the access identity and the access category of each access attempt from the UEs. The network configures barring parameters based on the access identity and the access category. For example, access identities are configured at the UE as listed in TS 22.261, and each of access categories are defined by combination of conditions related to UEs and a type of access attempt as listed in TS 22.261. Additionally, access priority for the RedCap UE can also be configured by the network to realize prioritized cell access while taking system traffic load into account.
  Providing DL/UL BWP indication for the RedCap UE:
  The network may provide DL or UL BWP indication to the UE. The DL or UL BWP indication for the extended device type UE is associated with the device type related information of the extended device type UE during a random access procedure or after an RRC connection is established for the extended device type UE. The DL/UL BWP indication indicates one or more of:
    a default DL BWP for RedCap UE;
    an initial DL/UL BWP for RedCap UE;
    an active DL/UL BWP for RedCap UE; and
    a BWP timer for RedCap UE.
  Determining an inter-UE multiplexing scheme between the RedCap UE and legacy UE:
  The network may determine an inter-UE multiplexing scheme to multiplex traffics of the RedCap UE and the legacy UE. The inter-UE multiplexing scheme for the extended device type UE is associated with the device type related information of the extended device type UE during a random access procedure or after an RRC connection is established for the extended device type UE. The multiplexing scheme includes:

Option 1: the network configuring shared radio resources for the RedCap UE and the legacy UE:

In an inter-UE multiplexing scheme, the RedCap UE and the legacy UE share the same radio resources allocated by the network. The radio resources include radio resources in time and frequency domains allocated by the network, such as the gNB.

Option 2: the network configuring dedicated radio resources for RedCap UE:

In an inter-UE multiplexing scheme, the network, such as the gNB, allocates different sets of radio resources to the RedCap UE and the legacy UE. That is, the network allocates radio resources dedicated to the RedCap UE in addition to radio resources for the legacy UE. The radio resources include radio resources in time and frequency domains.

Embodiment 2: Access Restriction

Figure 5:
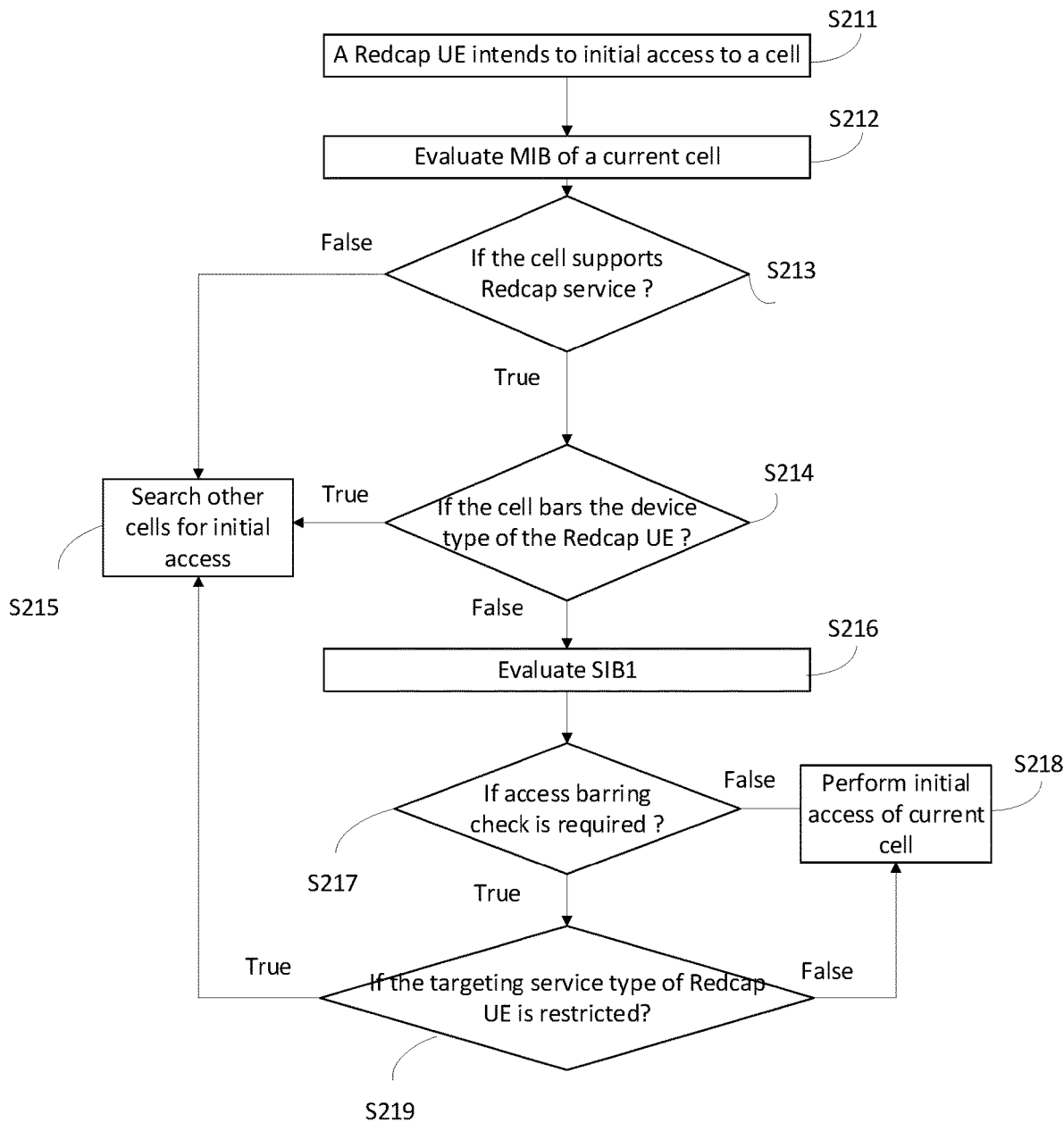
FIG. 5 illustrates a schematic view showing an embodiment of a radio access method for an extended device type UE.

With reference to FIG. 5, the gNB provides connection indication information of a certain device type represented by device type related information of the extended device type UE (S10). The certain device type comprises a device type of the extended device type UE or a device type of a legacy UE. The connection indication information of a certain device type is transmitted in a broadcast information block, such as MIB or SIB1. For broadcast information in PBCH, in order to carry connection indication information, the BCCH-BCH-MessageType of BCCH-BCH-Message can be set to messageClassExtension or MIB. The UE obtains, from a base station, the connection indication information of the certain device type represented by the device type related information of the extended device type UE (S11) and determines an initial access scheme based on the connection indication information (S12). The UE performs an initial access procedure with the gNB according to the initial access scheme (S13). The gNB performs an initial access procedure with the extended device type UE according to the initial access scheme (S14).

The initial access scheme of the RedCap UE is related to connection indication information and configuration of various initial access signals, parameters, operations, phases, radio resources, configurations, identities, access restrictions and features of the RedCap UE. The connection indication information may comprise signaling or configuration of the resources, identities, access restrictions and features and may be transmitted in a BCCH-BCH-Message, an SSB, MIB, type-0 PDCCH, SIB1, and OSI for the extended device type UE. The parameters may comprise backoff parameters. The resources may comprise access to a network, a cell, or a frequency. Embodiments of the network providing access restrictions to the RedCap UE are detailed in the following. The access restrictions comprise cell reservation, connection request rejection, and random access rejection.

Embodiment 2-1: Cell Reservation (Before Sending an RRC Connection Request)

The connection indication information comprises access control information based on which the extended device type UE determines whether to send a connection request or not. In an embodiment, the connection indication information of a certain device type in the broadcast information block may include cell barring information, access control check information, or access barring information for a certain device type in a current cell or at least one of a plurality of cells other than the current cell. Embodiments of the network performing cell reservation are detailed in the following. Cell reservation comprises broadcasting access control information in a broadcast information block, such as a master information block (MIB) or a SIB. The access control information may be referred to as cell reservation indication and comprise cell barring information, access control check information, and access barring information. In determining the initial access scheme, the extended device type UE may determine whether to send a connection request or not based on the connection indication information. For example, before sending any connection request to the gNB, the RedCap UE may evaluate a broadcast information block sent from the gNB and determine whether to send a connection request for a targeting service type (or use case) is required based on the broadcast information block. A service type for a UE sometimes is referred to as a use case for the UE. Embodiments of cell reservation schemes comprise transmitting by the network one or more of the following broadcast information blocks to carry access control information:

MIB; and

SIB1.

The broadcast information block has a parameter BCCH-BCH-MessageType that can be set to messageClassExtension or MIB for the RedCap UE. Embodiments of cell reservation schemes using MIB and SIB1 are detailed in the following:

MIB:

The network may use broadcast information in an MIB to represent:

cell barring information for a certain device type (or service type) using an existing barring information element (IE) or a RedCap UE specific barring information element (IE), i.e., a RedCap UE specific RRC message for cell barring.

SIB1:

The network may use broadcast information in an SIB1 to represent:

access control check information which the RedCap UE can use to determine when access barring check is required for a certain device type (or service type) of the RedCap UE; and/or access barring information for a certain device type (or service type) represented by a RedCap UE specific access identity and/or an access category.

The access control check information includes whether access barring check is required for the certain device type. That is, the UE 10 need to decode access barring information only when the access control check information has indicated the UE 10 to read access barring information. The cell reservation indication may indicate:

a service type or a certain device type of the RedCap UE that can or cannot be served in this network;

a certain device type that can or cannot camp on a current cell of the gNB; and/or a certain device type that can or cannot camp on other cells using a frequency or different frequencies.

The certain device type may comprise the RedCap UE and/or the legacy UE. The broadcast information block includes access control information for the certain device type to access a frequency in a current cell or at least one of a plurality of cells other than the current cell.

Embodiment 2-1-1 Example of Cell Reservation Steps

Figure 6:
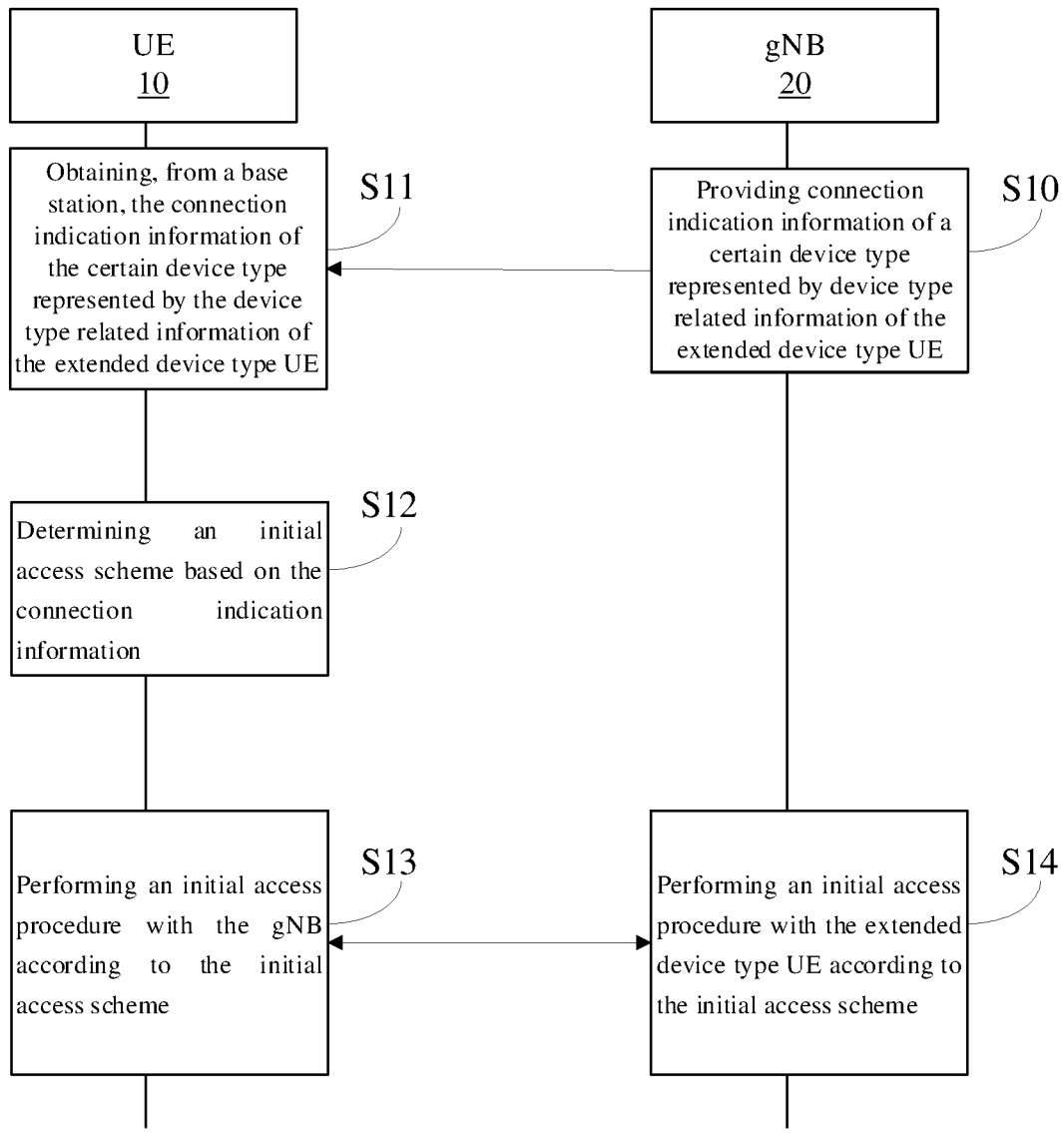
FIG. 6 illustrates a schematic view showing an embodiment of the disclosed method with cell reservation.

With reference to FIG. 6, an embodiment of the disclosed method with cell reservation is detailed in the following.

In an attempt to perform initial access to a current cell (S211), the RedCap UE evaluates a MIB of the current cell (S212).

The RedCap UE determines whether the cell supports the RedCap service type based on the MIB evaluated (S213). If the cell does not support the RedCap service type, the RedCap UE try to perform initial access to other cells based on the information given in the MIB (S215). If the cell supports the RedCap service type, the RedCap UE checks if the device type of the RedCap UE has been barred by the current cell according to the cell reservation indication (S214). If the device type of the RedCap UE has been barred by the current cell, the RedCap UE performs the step S215. If the device type of the RedCap UE has not been barred by the current cell, the RedCap UE evaluates the information in SIB1 (S216).

The RedCap UE is informed whether the access barring check is required or not based on information (e.g., access control check information) in SIB1 (S217). If the access barring check is not required, the RedCap UE performs initial access in the current cell (S218). If the access barring check is required, the RedCap UE performs the access barring check by determining whether the service type of the RedCap UE is restricted by the access control in the current cell (S219). If the service type of the RedCap UE is restricted by the access control in the current cell, the RedCap UE performs the S215. If the service type of the RedCap UE is not restricted by the access control in the current cell, the RedCap UE performs the step S218.

Embodiment 2-2: Connection Request Rejection to an RRC Connection Request

The connection indication information comprises a request rejection to a connection request with a device type sent from the extended device type UE to the base station. In an embodiment, in obtaining the connection indication information, the extended device type UE obtains a request rejection to a connection request with a device type sent from the extended device type UE to the base station. The gNB performs access restriction based on a connection type requested by RedCap UE. The connection type is associated with a device type of the RedCap UE and represented by an access identity or an access category of the RedCap UE.

The RedCap UE provides a device type (or service type) during transmitting an RRC connection request to the gNB. That is, the RedCap UE sends RRCConnection-Requst including the device type (or service type) to the gNB.

The gNB determines whether to serve or reject the request with the device type. The gNB sends RRCConnection-Reject to the RedCap UE when rejecting the request.

Embodiment 2-3: Random Access Restriction

The connection indication information comprises random access restrictions for the certain device type. In an embodiment, in obtaining the connection indication information, the extended device type UE obtains random access restriction for the certain device type from the base station. If PRACH resources are shared between RedCap UEs and legacy UEs. To protect legacy UE, the network may provide one or more of the following settings to the RedCap UE during a random access procedure:

a restricted PRACH preamble;
restricted PRACH resources;
a reduced maximal number of attempts of PRACH; and
a longer backoff time.

The restricted preamble is a RedCap UE specific PRACH preamble and may comprise a restricted preamble sequence or a preamble format for the RedCap UE. The restricted PRACH resources are restricted time-frequency radio resources wherein PRACH preamble and signals can be transmitted for the RedCap UE. The reduced maximal number of attempts of PRACH is represented by a parameter preambleTransMax. The parameter preambleTransMax is a max number of random access preamble transmission performed by the RedCap UE before declaring a failure for the RedCap UE. The parameter preambleTransMax may reduce to a smaller value than the legacy UE. Definition of the parameter preambleTransMax can be found in TS 38.321.

The network may provide a longer backoff time for the RedCap UE by select a random backoff time according to a uniform distribution between 0 and a longer backoff parameter PREAMBLE_BACKOFF for the RedCap UE perform preamble retransmission. Definition of the backoff time can be found in TS 38.321.

Embodiment 3

The initial access scheme of the extended device type UE is related to connection indication information and configurations of various initial access radio resources and features of the extended device type UE. The connection indication information may comprise signaling or configuration of the resources and features and may be transmitted in a BCCH-BCH-Message, an SSB, MIB, type-0 PDCCH, SIB1, and OSI for the extended device type UE. The initial access radio resources and features may comprise control resource set zero (i.e., common control resource set, controlResourceSetZero or CORESET #0), search space zero (i.e., common search space zero or searchSpaceZero), an initial UL BWP, an initial DL BWP, SIB1, OSI, SI scheduling, PRACH configuration, PRACH preamble, SCS, modulation and coding scheme (MCS), an HARQ-ACK scheme, msg2/msg3/msg4 configuration, and a backoff parameter for the extended device type UE. An embodiment of the invention provides initial access resources and paging resources for the RedCap UE as well as initial access and paging resources used legacy UE.

Embodiment 3-1: CORESET #0

A common control resource set is known as controlResourceSetZero or CORESET #0. In an embodiment, the network provides CORESET #0 resources for the RedCap UE. The CORESET #0 resources for the RedCap UE may comprise:

CORESET #0 resources shared by the RedCap UE and the legacy UE; or
CORESET #0 resources dedicated to the RedCap UE separated from CORESET #0 resources for the legacy UE.

Embodiments of the CORESET #0 resources for the RedCap UE are detailed in the following.

CORESET #0 resources shared by the RedCap UE and the legacy UE:

When the network allocates CORESET #0 resources shared by the RedCap UE and the legacy UE to the RedCap UE, the network may provide the same Type-0 physical downlink control channel (PDCCH) configuration (e.g., pdcch-ConfigSIB1) in MIB for the RedCap UE and the legacy UE. The Type-0 PDCCH configuration pdcch-ConfigSIB1 includes configurations of:
control resource set zero (i.e., controlResourceSetZero); and
search space zero (i.e., searchSpaceZero).
CORESET #0 resources dedicated to the RedCap UE separated from CORESET #0 resources for the legacy UE:
When the network allocates CORESET #0 resources dedicated to the RedCap UE separated from CORESET #0 resources for the legacy UE, the network may provide another set of pdcch-ConfigSIB1 in MIB to the RedCap UE, different from the pdcch-ConfigSIB1 in MIB for the legacy UE. The RedCap UE receives and uses the another set of pdcch-ConfigSIB1 in MIB including:
controlResourceSetZero for the RedCap UE; and
searchSpaceZero for the RedCap UE.

Embodiment 3-2: Information of System Information Block One/Other System Information (SIB1/OSI) for RedCap UE In an embodiment, the network provides SIB1/OSI for the RedCap UE. The SIB1/OSI for the RedCap UE may comprise:
separated SIB1 content dedicated to RedCap UE; and
separated set of OSI content dedicated to RedCap UE
The connection indication information comprises SIB1 or OSI that contains newly defined SIB1 or OSI content for extended device type UE associated with an existing system information radio network temporary identifier (SI-RNTI). In an embodiment, in obtaining the connection indication information, the extended device type UE obtains SIB1 or OSI including a newly defined SIB1 or OSI content for extended device type UE using the existing SI-RNTI for extended device type UE. In another embodiment, in obtaining the connection indication information, the extended device type UE obtains SIB1 or OSI including existing SIB1 or OSI content for extended device type UE using the specific SI-RNTI for extended device type UE. In this case, the network may define and provide separated SI-RNTI specific to the RedCap UE, referred to as R-SI-RNTI, and provide the R-SI-RNTI to the RedCap UE. The RedCap UE uses the R-SI-RNTI to receive, descramble, and obtain the separated SIB1 content dedicated to RedCap UE and the separated set of OSI content dedicated to RedCap UE. The separated SIB1 content or separated set of OSI content dedicated to RedCap UE may comprise one or more of:
PRACH configuration;
system information (SI) scheduling information; and
an initial DL/UL BWP.

Embodiment 3-3: PRACH Resources for the RedCap UE

The network may provide a separated set of PRACH resources for the RedCap UE. For example, the separated set of PRACH resources may comprise:
time and frequency domain radio resources of PRACH (i.e., a set of PRACH configurations for RedCap UE); and/or
a preamble sequence (i.e., a set of preambles available for the RedCap UE).
a preamble format (i.e., a set of preamble formats available for the RedCap UE).

Embodiment 3-4: Msg2/Msg3/Msg4 Configuration for RedCap UE

The connection indication information comprises RAR in msg2 associated with RA-RNTI for extended device type UE. In an embodiment, in determining the initial access scheme, the extended device type UE obtains a specific RA-RNTI for extended device type UE to receive RAR in msg2 for the extended device type UE. The content of the RAR in the msg2 for the extended device type UE may be different from a RAR in a msg2 for a legacy UE. The network may define and provide configuration of msg2, msg3, and/or msg4 for the RedCap UE. The network may define a random access RNTI (RA-RNTI) specific to the RedCap UE, referred to as R-RA-RNTI. The RedCap UE uses the calculated R-RA-RNTI to receive, descramble, and obtain the random access response (RAR) dedicated to RedCap UE. The separated RAR in msg2 dedicated to RedCap UE may comprise:
a msg3 PUSCH grant for the RedCap UE; and/or
a backoff parameter for the RedCap UE for next PRACH transmission.
The connection indication information comprises configuration of msg2, msg3, and/or msg4 for the extended device type UE. The configuration of msg2, msg3, and/or msg4 for the RedCap UE may be different from the configuration for the legacy UE and may comprise:
radio resource configuration;
DL/UL BWP;
SCS;
modulation and coding scheme (MCS) or repetitions for coverage enhancement (e.g., a repetition parameter for msg3 transmission); and/or
HARQ-ACK scheme (e.g., a repetition number of PUCCH carrying HARQ-ACK or HARQ-ACK feedback timing with respect to reception time of a msg4 message)
The broadcast information block may include an initial UL BWP for the extended device type UE to transmit uplink messages or hybrid automatic repeat request acknowledgment (HARQ-ACK) feedback during initial access. The HARQ-ACK feedback scheme comprises one or more of:
a repetition number of PUCCH carrying HARQ-ACK; and
HARQ-ACK feedback timing with respect to reception time of a msg4 message.

Embodiment 3-5: Paging Resources for RedCap UE

The connection indication information comprises paging information newly defined for extended device type UE associated with an existing paging RNTI (P-RNTI) or existing paging information associated with a specific P-RNTI for extended device type UE. In an embodiment, in obtaining the connection indication information, the extended device type UE obtains the newly defined paging information for extended device type UE using the existing P-RNTI or the existing paging information using the specific P-RNTI for extended device type UE. The network may define and provide paging resources for the RedCap UE. The network may define and provide P-RNTI specific to the RedCap UE, referred to as R-P-RNTI, and provide the R-P-RNTI to the RedCap UE. The RedCap UE uses the R-P-RNTI to receive, descramble, and obtain the paging dedicated to RedCap UE. The paging resources for the RedCap UE may comprise a separated initial DL BWP dedicated to the RedCap UE different from an initial DL BWP for the legacy UE. The RedCap UE receives one or more the following message in the separated initial DL BWP dedicated to the RedCap UE:
paging message(s); and
short message(s) in paging DCI.

Embodiment 4: Initial Configurations for RedCap UE

The initial access scheme of the extended device type UE is related to connection indication information and configurations of various initial access radio resources and features of the extended device type UE. The connection indication information may comprise signaling or configuration of the resources and features and may be transmitted in a BCCH-BCH-Message, an SSB, MIB, type-0 PDCCH, SIB1, and OSI for the extended device type UE. The initial access radio resources and features may comprise CORESET #0, searchSpaceZero, an initial UL BWP, an initial DL BWP, for the extended device type UE.

Embodiment 4-1: Initial DL BWP Switch

The RedCap UE performs initial DL BWP switch after receiving Type-0 PDCCH. The initial DL BWP for the extended device type UE may comprise an initial DL BWP the same as a legacy UE or an initial DL BWP different from a legacy UE. In an embodiment, the bandwidth of the RedCap UE is larger than synchronization signal block (SSB) and CORESET #0. The RedCap UE may share the same initial DL BWP with the legacy UE. Similarly, the RedCap UE and the legacy UE may share the same SSB and CORESET #0. In an embodiment, the RedCap UE uses the same cell-defining SSB as the legacy UE for cell search and locating the initial DL BWP. In an embodiment, the RedCap UE uses the same CORESET #0 as the legacy UE. The configuration of the CORESET #0 for the RedCap UE is the same as the legacy UE provided by pdcch-ConfigSIB1 in an MIB. The MIB includes configurations of CORESET #0 resources for the extended device type UE to monitor PDCCH of SIB1, paging information for the extended device type UE, or downlink messages for the extended device type UE during initial access. The RedCap UE uses pdcch-ConfigSIB1 to locate Type-0 PDCCH common search space.

The RedCap UE monitors and receives Type-0 PDCCH using an SI-RNTI for the RedCap UE. The SI-RNTI for the RedCap UE may comprise an SI-RNTI the same as the legacy UE or a RedCap UE specific SI-RNTI, such as the R-SI-RNTI.

Option 1: SI-RNTI the same as the legacy UE:
In an embodiment where the SI-RNTI for the RedCap UE is the same as an SI-RNTI of the legacy UE, a RedCap UE specific DL/UL BWP may be activated by a bandwidth part indicator (DL/UL BWP indicator) in DCI of Type-0 PDCCH. The network may provide the DL/UL BWP indicator. The connection indication information comprises a DL BWP indicator in downlink control information (DCI) of Type-0 physical downlink control channel (PDCCH) or in msg2 or msg4. The initial DL BWP for the extended device type UE is switched according to the DL BWP indicator in DCI of Type-0 PDCCH or in msg2 or msg4. Similarly, an initial UL BWP for the extended device type UE may be indicated using a UL BWP indicator in DCI of Type-0 PDCCH or in of msg2 or msg4. The initial UL BWP for the extended device type UE can be the same as or different from a legacy UE.

Option 2: RedCap UE specific SI-RNTI (e.g., R-SI-RNTI)
In an embodiment where the SI-RNTI for the RedCap UE is the RedCap UE specific SI-RNTI (e.g., R-SI-RNTI), a RedCap UE specific DL/UL BWP may be activated by a DL/UL BWP indicator in DCI scrambled by the R-SI-RNTI.

If the DL BWP indicator is not defined in DCI, the RedCap UE uses the same initial DL BWP as the legacy UE for receiving SIB1. If the DL BWP indicator is defined in an instance of DCI and the DL BWP indicator indicate an initial DL BWP for the RedCap UE different from the initial DL BWP for the legacy UE, the DL BWP is activated by the indicator, and the resources that the RedCap UE uses to receive SIB1 in the activated DL BWP is also provided in corresponding DCI, such as the instance of DCI. The RedCap UE performs DL BWP switching and receives RedCap UE specific SIB1 in the RedCap UE specific DL BWP.

Figure 7:
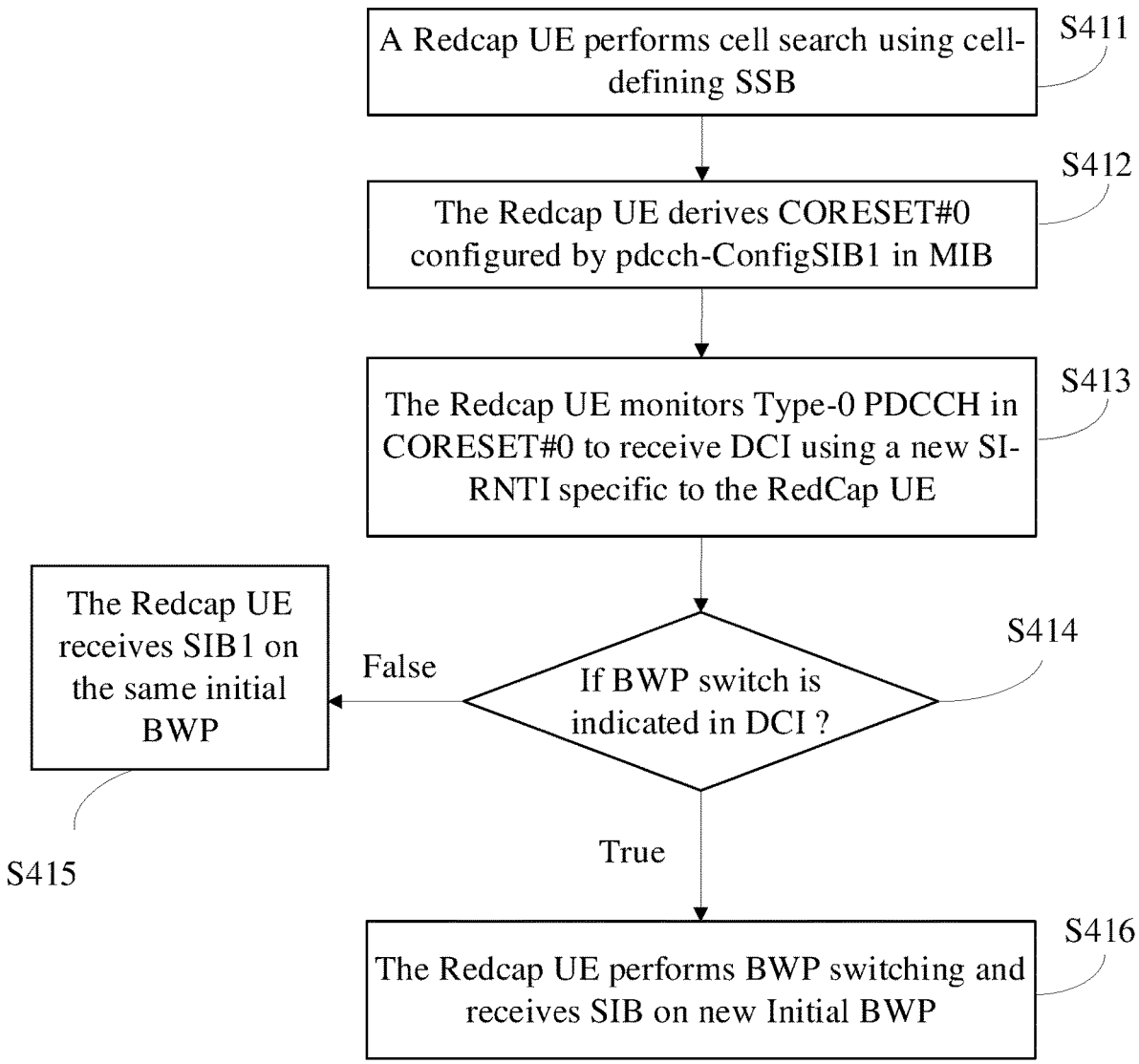
FIG. 7 illustrates a schematic view showing an embodiment of the disclosed method with initial DL BWP switching for the RedCap UE.

Embodiment 4-1-1: An Example of an Initial DL BWP Switching Procedure for the RedCap UE With reference to FIG. 7, an embodiment of the disclosed method with initial DL BWP switching for the RedCap UE is detailed in the following.

The RedCap UE performs cell search using a cell-defining SSB (S411) the same as the legacy UE.

The RedCap UE derives resources of CORESET #0 configured by pdcch-ConfigSIB1 in MIB (S412) the same as the legacy UE. The MIB is sent from the gNB to the RedCap UE.

The RedCap UE monitors Type-0 PDCCH in the CORESET #0 to receive DCI from the gNB using a new SI-RNTI specific to the RedCap UE, such as the R-SI-RNTI (S413).

The RedCap UE determines whether to perform initial DL BWP switch or not based on the DL BWP in the DCI (S414). When the DL BWP indicator in the DCI indicate a new initial DL BWP that the gNB has assigned to the RedCap UE, the RedCap UE determines to perform initial DL BWP switch to the new initial DL BWP. When the BWP indicator in the DCI does not indicate a new initial DL BWP for the RedCap UE, the RedCap UE determines to not perform initial DL BWP switch and use the initial DL BWP the same as the legacy UE.

If the RedCap UE determines to perform initial DL BWP switch, the RedCap UE receives the RedCap UE specific SIB1 in the new initial DL BWP that the gNB has assigned to the RedCap UE (S416). If the RedCap UE determines not to perform initial DL BWP switch, the RedCap UE receives SIB1 in the same initial DL BWP as the legacy UE to (S415).

Embodiment 4-2

DL BWP switch after receiving MIB: In an embodiment, the MIB for the extended device type UE may be carried on radio resources of a cell-defining SSB same as a legacy UE or different from a legacy UE. The extended device type UE obtains an initial DL/UL BWP for the extended device type UE based on the cell-defining SSB. The cell-defining SSB directs to an initial DL/UL BWP for the extended device type UE. Alternatively, the MIB for the extended device type UE may be carried on radio resources of a non-cell-defining SSB with respect to a legacy UE. The extended device type UE obtains an initial DL/UL BWP for the extended device type UE based on the non-cell-defining SSB. The non-cell-defining SSB directs to an initial DL/UL BWP for the extended device type UE. In an embodiment where the bandwidth of the RedCap UE is larger than SSB but smaller than CORESET #0, the RedCap UE may perform DL/UL BWP switch after receiving MIB.

The RedCap UE performs cell search and locates an initial DL/UL BWP. The RedCap UE may use the cell-defining SSB same as the legacy UE for cell search.

The RedCap UE derives CORESET #0 resources based on configuration different from the legacy UE. The location of CORESET #0 for the RedCap UE is provided by MIB and may be within the initial DL BWP the same as the legacy UE or within a RedCap UE specific DL BWP different from the initial DL BWP of the legacy UE. In an embodiment, CORESET #0 resources for the RedCap UE are located within the same initial DL BWP for the legacy UE. In an embodiment, CORESET #0 resources for the RedCap UE are located within a RedCap UE specific DL BWP different from the initial DL BWP for the legacy UE. In an embodiment, a DL BWP indicator in MIB may indicate the RedCap UE specific DL BWP.

If a DL BWP indicator is not defined in MIB, the RedCap UE uses the same initial DL BWP as the legacy UE for locating CORESET #0. The initial DL BWP for legacy UE is determined based on the resource location of CORESET #0.

If a CORESET #0 resource specific to RedCap UE is indicated in the MIB, then the RedCap UE specific initial DL BWP can be derived from the resource location of RedCap UE specific CORESET #0.

If a DL BWP indicator is defined in MIB and indicates an additional DL BWP for the RedCap different from the initial DL BWP for the legacy UE, the additional DL BWP for the RedCap is activated, and the resources used for locating CORESET #0 in the activated DL BWP are also provided by the gNB. The additional DL BWP for the RedCap UE is referred to as the RedCap UE specific DL BWP.

If the CORESET #0 resources are located within a Red-Cap UE specific DL BWP, the RedCap UE monitors type-0 PDCCH to receive SIB1 in the RedCap UE specific DL BWP.

Embodiment 4-2-1: An Example of a DL BWP Switch Procedure after Receiving MIB

Figure 8:
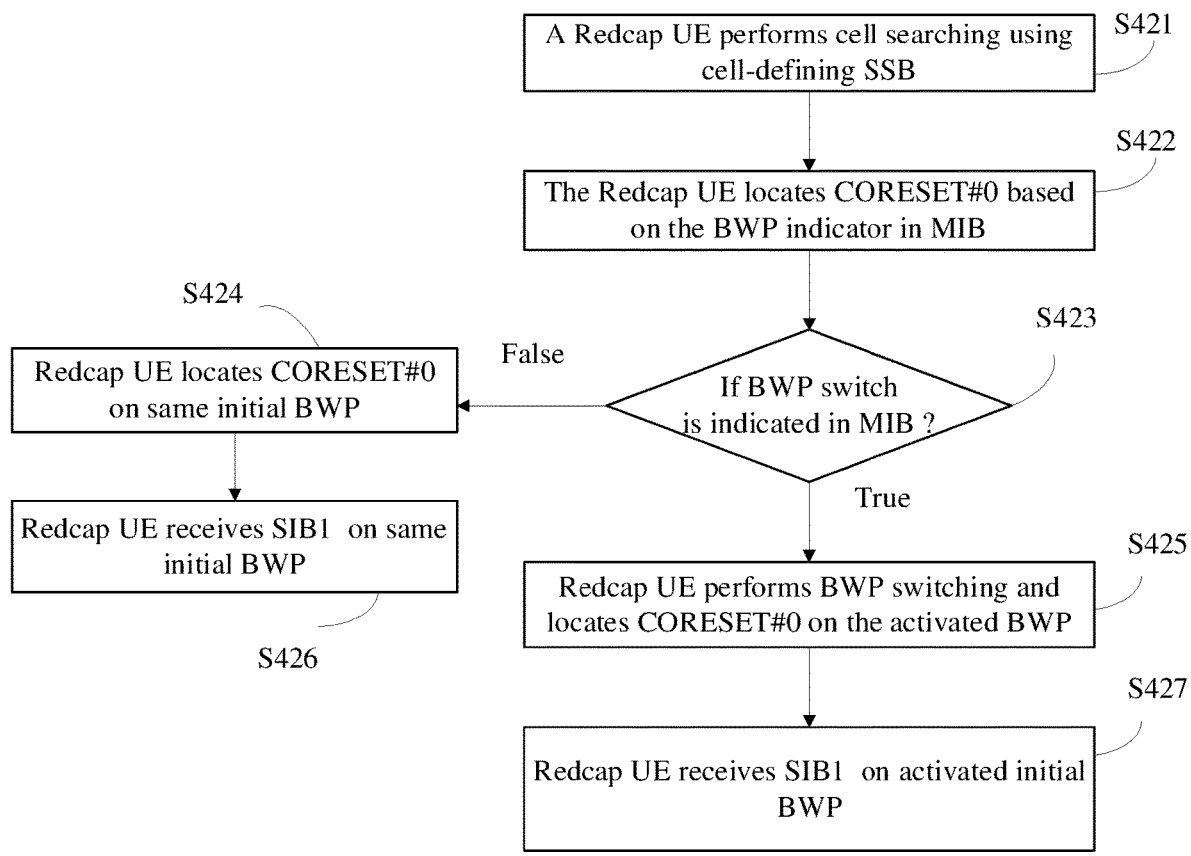
FIG. 8 illustrates a schematic view showing an embodiment of the disclosed method with a DL BWP switch procedure after receiving MIB.

With reference to FIG. 8, an embodiment of the disclosed method with a DL BWP switch procedure after receiving MIB is detailed in the following.

The RedCap UE performs cell search using cell-defining SSB (S421).

The RedCap UE evaluates MIB, which has a field of DL BWP indicator, for determining radio resources of the CORESET #0 (referred to as CORESET #0 resource). The Redcap UE locates CORESET #0 based on the DL BWP indicator in MIB (S422).

The RedCap UE determines whether radio resources of the CORESET #0 are located within another DL BWP different from the initial DL BWP for legacy UE (S423). When the DL BWP indicator in the MIB indicates a new DLBWP for the RedCap UE, the RedCap UE determines that the radio resources of the CORESET #0 are located within the new DL BWP for the RedCap UE different from the initial DL BWP for legacy UE. When the DL BWP indicator does not indicate a new DL BWP for the RedCap UE or the MIB does not has the DL BWP indicator, the RedCap UE determines that the radio resources of the CORESET #0 are located within the initial DL BWP for the legacy UE.

If the radio resources of the CORESET #0 are located within a new DL BWP for the RedCap UE different from the initial DL BWP, the new DL BWP is assumed to be activated. The RedCap UE performs DL BWP switching to the activated DL BWP, locates CORESET #0 in the activated DL BWP (S425), and receives SIB1 in the activated DL BWP (S427). If the radio resources of the CORESET #0 are located within the initial DL BWP for legacy UE, the RedCap UE locates CORESET #0 in the same initial DL BWP for the legacy UE (S424), and receives SIB1 in the initial DL BWP for the legacy UE (S426).

The RedCap UE receives SIB1 in corresponding DL BWP using the SI-RNTI or a specific RNTI, such as the R-SI-RNTI, defined for the RedCap UE in S426 or S427 respectively.

Embodiment 4-3: Initial DL/UL BWP Selection Based on a Cell-Defining SSB Separated from the Legacy UE The network may configure cell-defining SSBs for the RedCap UE to achieve one or more of the following objectives:
  serve the RedCap UE with bandwidth smaller than CORESET #0 for legacy UE;
  serve the RedCap UE with bandwidth smaller than SSB for legacy UE but larger than specific defined SSB for the RedCap UE;
  serve the RedCap UE with relaxed UE processing time during an initial access procedure; and
  avoid initial access blocking with the legacy UEs.

The RedCap UE performs cell search over cell-defining SSBs defined for the RedCap UE and hence obtains the initial DL/UL BWP location after the cell search. The frequency location for RedCap specific SSBs can be defined based on Global Synchronization Channel Number (GSCN) parameters in TS 38.104 or absolute-FrequencySSB parameter in TS 38.331.

The RedCap UE derives CORESET #0 location and receives SIB1 following the same scheme as the legacy UE, but within the initial DL/UL BWP specific to the RedCap UE. Compared to the legacy UE, the RedCap UE performs an independent initial access procedure with separate resource configurations during initial access.

Table 1 shows the structure of a broadcast control channel (BCCH)-broadcast channel (BCH) message (BCCH-BCH-Message) in TS 38.331. For cell-defining SSB used for cell search by RedCap UE, in order to derive SIB1 or initial access configurations, the parameter BCCH-BCH-MessageType of BCCH-BCH-Message in the physical broadcast channel (PBCH) of the cell-defining SSB is set to MIB.

TABLE 1

| | |
|---|---|
| BCCH-BCH-Message ::= | SEQUENCE { |
| message | BCCH-BCH-MessageType |
| } | |
| BCCH-BCH-MessageType ::= | CHOICE { |
| mib | MIB, |
| messageClassExtension | SEQUENCE { } |
| } | |

Embodiment 4-4: RedCap UE Performs Initial DL/UL BWP Selection Over Non-Cell-Defining SSB For legacy UE, non-cell-defining SSB is used for RRM measurement. In 5G NR, there is a mechanism for a non-cell-defining SSB PBCH payload to point to a cell-defining SSB via pdcch-ConfigSIB1 configuration bits in the PBCH payload since the non-cell-defining SSB is not associated with SIB1. In an embodiment, similar mechanism can be adopted to point to a RedCap specific cell-defining SSB via non-cell-defining SSB. In this case, the initial DL/UL BWP selection based on a cell-defining SSB in embodiment 4-3 can be applied accordingly.

In another embodiment, network can redefine pdcch-ConfigSIB1 configuration bits or other bits reserved for future use in the PBCH payload for non-cell-defining SSB to convey SIB1 associated information for RedCap UE. In another embodiment, the network may define new MIB for the RedCap UE. The new MIB is carried in physical broadcast channel (PBCH) of the non-cell-defining SSB and has a parameter BCCH-BCH-MessageType being set to messageClassExtension.

Note that non-cell-defining SSBs for the legacy UE can be viewed as cell-defining SSBs for the RedCap UE. From legacy UE's perspective, the RedCap UE performs cell search over a non-cell-defining SSB defined for the legacy UE. Non-cell-defining SSBs used for the RedCap UE can also be used for channel measurement by the legacy UE. From RedCap UE's perspective, the RedCap UE derives CORESET #0 location and receives SIB1 within the initial DL BWP corresponding to the cell-defining SSB for RedCap UE. In this scheme, the initial access blocking between legacy UE and RedCap UE over same SSB can be avoided.

Embodiment 5

In an embodiment, the network performs device type identification and parameter configuration for the RedCap UE during a random access procedure.

Embodiment 5-1

The network, such as the gNB, allocates one or more of the following physical random access channel (PRACH) parameters and sends a broadcast information block to the extended device type UE to indicate the one or more PRACH parameters:
an initial UL BWP for the extended device type UE;
PRACH resources for the extended device type UE; and
Preamble format for the extended device type UE.

The network may determine an initial UL BWP and/or physical random access channel (PRACH) resources for the RedCap UE and use a broadcast information block, such as SIB1, to indicate the initial UL BWP and/or the PRACH resources for the RedCap UE. The RedCap UE receives and determines the broadcast information block, such as SIB1, to obtain the initial UL BWP and/or the PRACH resources for the RedCap UE. The PRACH radio resources include radio resources for initial UL BWP in time and frequency domains. The initial UL BWP for the RedCap UE may comprise an initial UL BWP dedicated to the RedCap UE other than an initial UL BWP for the legacy UE. Alternatively, the initial UL BWP for the RedCap UE may comprise an initial UL BWP shared by the RedCap UE the legacy UE. Similarly, the gNB can configure a set of preamble formats suitable for RedCap UE in PRACH configuration via broadcast information block.

Upon receiving SIB1, the RedCap UE determines:
Initial UL BWP for the RedCap UE indicated in the SIB1; and/or
PRACH resources for the RedCap UE indicated in the SIB1; and/or
Preamble format for the RedCap UE indicated in the SIB1.

In an embodiment, the SIB1 may indicate:
the initial UL BWP dedicated to the RedCap UE; or
the initial UL BWP shared by the RedCap UE the legacy UE.

In an embodiment, the SIB1 may indicate the PRACH resources for the RedCap UE. The PRACH resources for the RedCap UE may comprise:
PRACH resources shared by the RedCap UE and the legacy UE; or
separated PRACH resources dedicated to the RedCap UE other than PRACH resources for the legacy UE.

Embodiment 5-2

The RedCap UE may transmit physical random access channel (PRACH) signals over the initial UL BWP for the RedCap UE. The initial UL BWP for the RedCap UE may comprise an initial UL BWP dedicated to the RedCap UE other than an initial UL BWP for the legacy UE. The initial UL BWP dedicated to the RedCap UE can be referred to as a RedCap UE specific initial UL BWP. Alternatively, the initial UL BWP for the RedCap UE may comprise an initial UL BWP shared by the RedCap UE the legacy UE. Accordingly, the RedCap UE may transmit PRACH signals over:
the initial UL BWP specific to RedCap UE in SIB1; or
the initial UL BWP the same as the initial UL BWP for the legacy UE.

In an embodiment, to transmit PRACH signals over the initial UL BWP same as the initial UL BWP for the legacy UE, the RedCap UE may use a preamble sequence for RedCap UE with a specific device type in the PRACH signals. In an embodiment, the RedCap UE may use PRACH resources for RedCap UE with a specific device type to transmit PRACH signals over the initial UL BWP same as the initial UL BWP for the legacy UE. In another embodiment, the RedCap UE may use the preamble sequence and the PRACH resources for RedCap UE with a specific device type to transmit PRACH signals over the initial UL BWP the same as the initial UL BWP for the legacy UE. The network, such as the gNB, configures one or more of the PRACH parameters for the extended device type UE when the initial UL BWP for the extended device type UE comprises the initial UL BWP shared by the extended device type UE the legacy UE:
a preamble sequence for the extended device type UE; or
the PRACH resources for PRACH transmission from the extended device type UE.

Accordingly, the network, such as the gNB, may configure one or more of the initial UL BWP, the preamble sequence, and the PRACH resources to differentiate the RedCap UE from the legacy UE. The gNB can identify a device type of the RedCap UE based on:
- the initial UL BWP for the UE;
- the preamble sequence for the UE; or
- the PRACH resources for PRACH transmission from the UE.

Embodiment 5-3

The network, such as gNB, determines and configures transmission parameters for a downlink transmission during random access to the extended device type UE based on the device type related information of the extended device type UE. The gNB determines and configures transmission parameters for random access response (RAR, referred to as msg2) and/or msg4 and/or msgB in two-step random access based on the identified device type of the extended device type UE taking into account one or more of the following capabilities of the UE:
- a coverage range;
- a processing time; and
- a supported bandwidth.

The coverage range can be expressed by metrics such as maximum coupling loss (MCL), maximum path loss (MPL), and maximum isotropic loss (MIL). Examples and illustrative definition of the coverage range can be found in TR 38.830. The processing time of the UE may comprise PDSCH processing procedure time. Examples and illustrative definition of the PDSCH processing procedure time can be found in TR 38.214. The PDSCH processing procedure time of the UE is, after the UE completed the reception of PDSCH, the time span that the UE requires to process the received PDSCH. The gNB transmits the RAR (i.e., msg2) to the RedCap UE according to the transmission parameters. The gNB transmits a RAR for RedCap UE to include one or more of the following configurations:
- a radio network temporary identifier (RNTI), such as random access radio network temporary identifier (RA-RNTI), specific to the RedCap UE, referred to as a RedCap UE specific RA-RNTI;
- a msg3 PUSCH grant for RedCap UE;
- a backoff parameter for RedCap UE;
- an indication of the initial UL BWP for msg3 and/or msg5 transmission from the RedCap UE; and
- an indication of the initial DL BWP for msg4 receiving by the RedCap UE.

Embodiment 5-4

The extended device type UE may transmit msg3 a message based on configuration in received RAR, and the device type related information of the extended device type UE is included in the msg3 message. In an embodiment, the RedCap UE transmit msg3 based on the configuration in received RAR. The RedCap UE can include the device type of the RedCap UE in the msg3 message.

Embodiment 5-5

In an embodiment, the RedCap UE may perform one or more of following operations to receive msg4:
- starting a random access contention resolution timer (e.g., ra-ContentionResolutionTimer) configured for RedCap UE; and
- monitoring and decoding PDCCH using the RNTI specific to RedCap UE.

Embodiment 5-6

In an embodiment, upon receiving msg4, the RedCap UE may perform the following operation to respond the msg4 message:
- sending HARQ-ACK for the msg4 message based on the PDSCH processing time capability specific to RedCap UE.

Embodiment 5-7

In an embodiment, the RedCap UE may transmit msg5 based on the configuration in received msg4. Device type related information of RedCap UE. The RedCap UE can include the device type of the RedCap UE in the msg5 message.

Embodiment 6

Whenever gNB received the device type related information, such as the device type or the UE capabilities, during the random-access procedure, the network can perform at least one of the followings operations for RedCap UE before establishment of an RRC connection for the RedCap UE:
- configuring the supported features of corresponding device type for the RedCap UE;
- configuring coverage enhancement related features for the RedCap UE;
- configuring access control or cell restriction for the RedCap UE;
- providing DL/UL BWP indication for the RedCap UE; and
- determining an inter-UE multiplexing scheme between the RedCap UE and legacy UE.

In providing the resource configuration, the base station performs one or more of the operations for extended device type UE based on the device type related information of the extended device type UE during the random access procedure for the extended device type UE. The operations are further detailed in the following:
Configuring the supported features for the RedCap UE:
   The network may configure the supported features for the UE. The supported features for the extended device type UE are associated with the device type related information of the extended device type UE during a random access procedure or after an RRC connection is established for the extended device type UE. The supported features for the UE features include one or more of:
   processing time;
   bandwidth supported;
   SCS supported; and
   duplex mode supported.
The processing time capabilities of the UE comprise processing time for one or more of the following UE operations:
   PDSCH decoding and HARQ-ACK feedback preparation;
   PDCCH decoding and PUSCH transmission preparation; and
   PDCCH decoding and CSI feedback preparation.
According to the processing time capabilities of the UE, the network allocates processing time for the UE for the UE operations of PDSCH decoding and HARQ-ACK transmission, PUSCH transmission, and CSI feedback.

Configuring coverage enhancement related features for the RedCap UE:

In order to extend the coverage range of RedCap UE, the network may configure coverage enhancement related features for the RedCap UE. The coverage enhancement related features for the extended device type UE are associated with the device type related information of the extended device type UE during a random access procedure or after an RRC connection is established for the extended device type UE. The coverage enhancement related features for the UE are preconfigured or are reconfigured by an RRC message or a downlink control information (DCI) to the UE. The coverage enhancement related features include one or more of:
  repetition number of PUSCH and PUCCH transmission; and
  uplink power control of PUSCH and PUCCH transmission.

The network may preconfigure the repetition number for the UE or send an RRC message or a downlink control information (DCI) to the UE to configure the repetition number for the UE.

Configuring access control or cell restriction for the RedCap UE:

The network may configure access control or cell restriction for the UE. The access control or cell restriction for the extended device type UE is associated with the device type related information of the extended device type UE during a random access procedure for the extended device type UE. The access control or cell restriction includes one or more of:
  access identity for the RedCap UE with a specific device type;
  access category for the RedCap UE with a specific device type;
  access priority for the RedCap UE with a specific device type;
  PRACH resource restriction for the RedCap UE;
  maximal attempts of PRACH for the RedCap UE; and
  a backoff time for the RedCap UE.

The certain device type can be indicated by a specific access identity or an access category. Based on operator policy, the network may prevent UEs, such as the RedCap UE and/or the legacy UE, from accessing the network using relevant barring parameters that vary depending on the access identity and the access category of each access attempt from the UEs. The network configures barring parameters based on the access identity and the access category. For example, access identities are configured at the UE as listed in Table 6.22.2.2-1 of TS 22.261, and each of access categories are defined by combination of conditions related to UEs and a type of access attempt as listed in Table 6.22.2.3-1 of TS 22.261. The PRACH resource restriction for the RedCap UE comprises PRACH radio resource for the RedCap UE. The PRACH radio resource include radio resources for initial UL BWP in time and frequency domains.

Providing DL/UL BWP indication for the RedCap UE:

The network may provide DL/UL BWP indication to the UE. The DL/UL BWP indication for the extended device type UE is associated with the device type related information of the extended device type UE during a random access procedure or after an RRC connection is established for the extended device type UE. The DL/UL BWP indication indicates one or more of:
  a default DL BWP for RedCap UE;
  an initial UL/DL BWP for RedCap UE;
  an active DL/UL BWP for RedCap UE; and
  a BWP timer for RedCap UE.

Determining an inter-UE multiplexing scheme between the RedCap UE and legacy UE:

The network may determine an inter-UE multiplexing scheme to multiplex traffics of the RedCap UE and the legacy UE. The inter-UE multiplexing scheme for the extended device type UE is associated with the device type related information of the extended device type UE during a random access procedure or after an RRC connection is established for the extended device type UE. The multiplexing scheme includes:
  Option 1: the network configuring shared radio resources for the RedCap UE and the legacy UE:
    In an inter-UE multiplexing scheme, the RedCap UE and the legacy UE share the same radio resources allocated by the network, such as the gNB. The radio resources include radio resources in time and frequency domains.
  Option 2: the network configuring dedicated radio resources for the RedCap UE:
    In an inter-UE multiplexing scheme, the network, such as the gNB, allocates different sets of radio resources to the RedCap UE and the legacy UE. That is, the network allocates radio resources dedicated to the RedCap UE in addition to radio resources for the legacy UE. The radio resources include radio resources in time and frequency domains.

Figure 9:
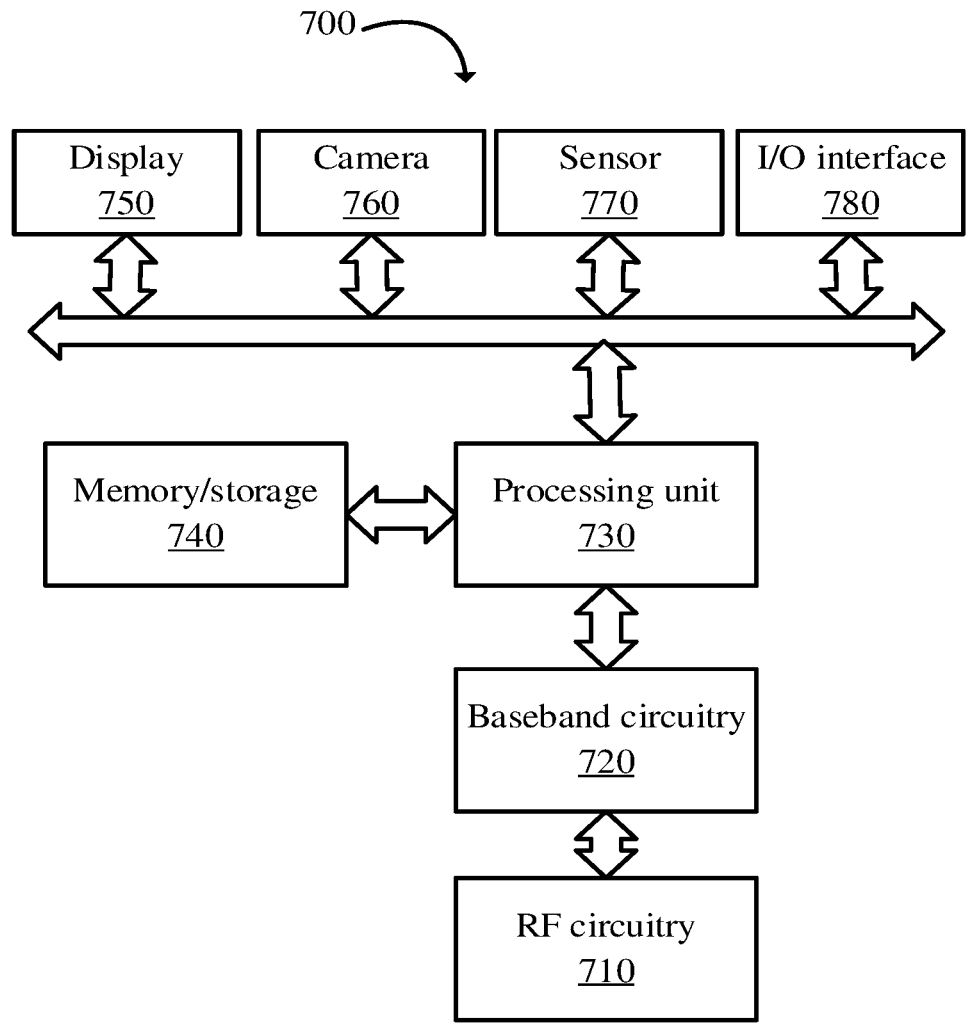
FIG. 9 illustrates a schematic view showing a system for wireless communication according to an embodiment of the present disclosure.

FIG. 9 is a block diagram of an example system 700 for wireless communication according to an embodiment of the present disclosure. Embodiments described herein may be implemented into the system using any suitably configured hardware and/or software. FIG. 9 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that may be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware.

The units as separated components for explanation are or are not physically separated. The shown units are or are not physical units, that is, located in one place or distributed on a plurality of network units. Some or all of the units are used according to the purposes of the embodiments. Moreover, each of the functional units in each of the embodiments may be integrated into one processing unit, physically independent, or integrated into one processing unit with two or more than two units.

If the software function unit is realized and used and sold as a product, it may be stored in a readable storage medium in a computer. Based on this understanding, the features proposed by the present disclosure may be essentially or partially realized as the form of a software product. Or, one part of the features beneficial to the conventional technology may be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

The disclosed method provides:
Mechanisms to define RedCap UE type(s).
Mechanisms to restrict RedCap UEs within intended use cases when accessing a telecommunication network: Thus, performance degradation resulted from RedCap UE working over eMBB service can be avoided.
Identification of RedCap UE type devices: The feature provides technical effects to avoid unnecessary network access attempt of the RedCap UEs, reduce UE power consumption, and balance network load. For example, the network can distinguish RedCap UE and performs relaxed scheduling and DL/UL data transmission during cell access and random-access procedure for RedCap UEs.
Cell-specific resources for RedCap UEs including:
 a) Initial access resource;
 b) Paging resource; and/or
 c) System information block (SIB) with index one (SIB1) or other system information (OSI).

An embodiment of the invention provides RedCap UE identification based on various UE identification schemes during an initial access stage. An embodiment of the invention provides RedCap UE identification based on various UE ID provision schemes during RRC_IDLE and RRC_CONNECTED state. An embodiment of the invention provides restricted access based on RedCap UE specific cell barring and access control. An embodiment of the invention provides initial access resource management for RedCap UEs. An embodiment of the invention provides initial DL/UL bandwidth part (BWP) adjustment for RedCap UEs.

An embodiment of the invention provides advantageous effects of maintaining coexistence performance for NR RedCap UEs and NR legacy UEs. An embodiment of the invention allows operators to restrict NR RedCap UE's access, ensure NR RedCap UE types are only used for the intended use cases, and reduce NR RedCap UE power consumption due to unnecessary cell access. In an embodiment of the invention, the network can distinguish RedCap UE from non-RedCap UE and performs relaxed scheduling and DL/UL data transmission during cell access and random-access procedure for RedCap UEs.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A radio access method executable in a base station, comprising:
   receiving device type related information from an extended device type user equipment (UE), wherein the device type related information shows support of UE capability which includes features of separate initial downlink (DL) bandwidth part (BWP) and separate initial uplink (UL) BWP for the extended device type UE;
   providing connection indication information to the extended devic type UE, wherein the connection indication information includes resource indications of a separate initial DL BWP and a separate initial UL BWP specific to the extended device type UE;
   transmitting a synchronization signal block (SSB) to the extended device type UE, wherein the SSB is within the separate initial DL BWP specific to the extended device type UE; and
   performing a random access procedure with the extended device type UE according to a random access scheme adopted by the extended device type UE.

2. The radio access method of claim 1, wherein the UE capability includes feature of a maximum bandwidth supported by the extended device type UE.

3. The radio access method of claim 1, wherein the SSB transmitted within the separate initial DL BWP is a non-cell-defining SSB configured for the extended device type UE.

4. The radio access method of claim 3, wherein the non-cell-defining SSB is used for the extended device type UE to perform measurement and is not associated with a location of SIB1.

5. The radio access method of claim 3, wherein the non-cell-defining SSB is used for the extended device type UE to derive a location of cell-defining SSB.

6. The radio access method of claim 1, wherein the connection indication information further includes an access priority associated with the extended device type UE for performing a random access.

7. The radio access method of claim 1, wherein the connection indication information further includes access control check information; the access control check information includes whether access barring check is required for an extended device type.

8. The radio access method of claim 1, wherein the connection indication information further includes an indication for the extended device type UE to access at least one of a plurality of cells other than a current cell associated with the base station using the same frequency or a different frequency.

9. The radio access method of claim 1, wherein the connection indication information further includes an indication that a cell associated with the base station is barred for access by the extended device type UE.

10. The radio access method of claim 9, wherein the base station does not receives a radio resource control (RRC) connection request from the extended device type UE during a random access procedure.

11. The radio access method of claim 9, wherein the base station transmits an RRC connection rejection in response to an RRC connection request sent from the extended device type UE during the random access procedure.

12. The radio access method of claim 1, wherein the connection indication information further includes random access restriction for the extended device type UE to perform 2-step or 4-step random access.

13. The radio access method of claim 12, wherein the random access restriction includes configurations specific to extended device type UE, wherein the configurations include dedicated physical random access channel (PRACH) preambles and separate PRACH resources adopted by the extended device type UE to transmit PRACH in the separate initial UL BWP.

14. The radio access method of claim 12, wherein the random access restriction includes a configuration specific to extended device type UE, wherein the configurations includes a maximum number of PRACH attempts allowed for the extended device type UE to transmit PRACH in the separate initial UL BWP.

15. The radio access method of claim 12, wherein the random access restriction includes a configuration specific to extended device type UE, wherein the configurations includes a repetition number adopted by the extended device type UE to transmit msg3 in the separate initial UL BWP.

16. The radio access method of claim 1, wherein the connection indication information further includes:
   configuration of subcarrier spacing (SCS) for the separate initial DL BWP specific to the extended device type UE; and
   configuration of SCS for the separate initial UL BWP specific to the extended device type UE.

17. The radio access method of claim 1, wherein the base station receives the device type related information transmitted by the extend device type UE in response to an inquiry from the base station.

18. The radio access method of claim 1, wherein the separate initial UL BWP specific to the extended device type UE is used for the extended device type UE to transmit uplink messages in PUSCH and hybrid automatic repeat request (HARQ) acknowledgement (HARQ-ACK) feedback during a random access procedure.

19. The radio access method of claim 1, wherein the separate initial DL BWP specific to the extended device type UE is used for the extended device type UE to receive downlink messages during a random access procedure and to monitor paging information.

20. A base station comprising:
a processor configured to call and run a computer program stored in a memory, to cause a device in which the processor is installed to execute the method of claim 1.

21. A chip, comprising:
a processor, configured to call and run a computer program stored in a memory, to cause a device in which the chip is installed to execute the method of claim 1.

22. A non-transitory computer-readable storage medium, in which
a computer program is stored, wherein the computer program causes a computer to execute the method of claim 1.

23. The radio access method of claim 1, wherein the UE capability supported by the extend device type UE has features different from UE capability supported by a legacy UE.

24. The radio access method of claim 1, wherein the separate initial DL BWP includes CORESET #0, and the SSB transmitted within the separate initial DL BWP is a cell-defining SSB.

25. The radio access method of claim 24, wherein
the CORESET #0 is used for the extended device type UE to monitor PDCCH of SIB 1 in order to obtain SIB1.

26. The radio access method of claim 25, wherein the connection indication information is carried in the SIB 1.

27. The radio access method of claim 24, wherein the cell-defining SSB is specific to the extended device type UE and a frequency location of the SSB is derived from absoluteFrequencySSB.

28. The radio access method of claim 1, wherein the connection indication information further includes resource indications of a DL BWP and a UL BWP specific to the extended device type UE after an RRC connection between the extended device type UE and the base station has been established.

29. The radio access method of claim 28, wherein a cell-defining SSB is transmitted from the base station to the extended device type UE, wherein the cell-defining SSB is transmitted within the DL BWP specific to the extended device type UE.

30. The radio access method of claim 28, wherein a non-cell-defining SSB is transmitted from the base station to the extended device type UE, wherein the non-cell-defining SSB is transmitted within the DL BWP specific to the extended device type UE.

31. The radio access method of claim 30, wherein the non-cell-defining SSB is used for the extended device type UE to derive a location of the cell-defining SSB.

32. The radio access method of claim 30, wherein the non-cell-defining SSB is used for the extended device type UE to perform measurement in the DL BWP specific to the extended device type UE.

33. The radio access method of claim 1, wherein the separate initial DL BWP includes CORESET #0, and the SSB transmitted within the separate initial DL BWP is a cell-defining SSB.

34. The radio access method of claim 33, wherein
the CORESET #0 is used for the extended device type UE to monitor PDCCH of SIB 1 in order to obtain SIB1.

35. The radio access method of claim 34, wherein the connection indication information is carried in the SIB 1.

36. The radio access method of claim 33, wherein the cell-defining SSB is specific to the extended device type UE and a frequency location of the SSB is derived from absoluteFrequencySSB.

37. A radio access method executable in an extended device type user equipment (UE), comprising:
transmitting device type related information from the extended device type user equipment (UE), wherein the device type related information shows support of UE capability which includes features of separate initial downlink (DL) bandwidth part (BWP) and separate initial uplink (UL) BWP for the extended device type UE;
obtaining, from a base station, connection indication information, wherein the connection indication information includes resource indications of a separate initial DL BWP and a separate initial UL BWP specific to the extended device type UE; and
receiving a synchronization signal block (SSB) from the base station, wherein the SSB is within the separate initial DL BWP specific to the extended device type UE; and
determining a random access scheme based on the connection indication information; and
performing a random access procedure with the base station according to the random access scheme.

38. The radio access method of claim 37, wherein
the UE capability includes feature of a maximum bandwidth supported by the extended device type UE.

39. The radio access method of claim 37, wherein the SSB received within the separate initial DL BWP is a non-cell-defining SSB configured for the extended device type UE.

40. The radio access method of claim 39, wherein the non-cell-defining SSB is used for the extended device type UE to perform measurement and is not associated with a location of SIB1.

41. The radio access method of claim 39, wherein the non-cell-defining SSB is used for the extended device type UE to derive a location of cell-defining SSB.

42. The radio access method of claim 37, wherein the connection indication information further includes an access priority associated with the extended device type UE for performing a random access.

43. The radio access method of claim 37, wherein the connection indication information further includes access control check information;
the access control check information includes whether access barring check is required for an extended device type.

44. The radio access method of claim 37, wherein the connection indication information further includes an indication for the extended device type UE to access at least one of a plurality of cells other than a current cell associated with the base station using the same frequency or a different frequency.

45. The radio access method of claim 37, wherein
the connection indication information further includes an indication that a cell associated with the base station is barred for access by the extended device type UE.

46. The radio access method of claim 45, wherein
the extended device type UE determines not to send a radio resource control (RRC) connection request to the base station during a random access procedure.

47. The radio access method of claim 46, wherein the random access restriction includes a configuration specific to extended device type UE, wherein the configurations includes a repetition number adopted by the extended device type UE to transmit msg3 in the separate initial UL BWP.

48. The radio access method of claim 45, wherein
the extended device type UE obtains an RRC connection rejection in response to an RRC connection request sent from the extended device type UE during the random access procedure.

49. The radio access method of claim 37, wherein
the connection indication information further includes random access restriction for the extended device type UE to perform 2-step or 4-step random access.

50. The radio access method of claim 49, wherein
the random access restriction includes configurations specific to extended device type UE, wherein the configurations include dedicated physical random access channel (PRACH) preambles and separate PRACH resources adopted by the extended device type UE to transmit PRACH in the separate initial UL BWP.

51. The radio access method of claim 49, wherein the random access restriction includes a configuration specific to extended device type UE, wherein the configurations includes a maximum number of PRACH attempts allowed for the extended device type UE to transmit PRACH in the separate initial UL BWP.

52. The radio access method of claim 37, wherein
the connection indication information further includes:
configuration of subcarrier spacing (SCS) for the separate initial DL BWP specific to the extended device type UE; and
configuration of SCS for the separate initial UL BWP specific to the extended device type UE.

53. The radio access method of claim 37, wherein the device type related information is transmitted by the extend device type UE in response to an inquiry from the base station.

54. The radio access method of claim 37, wherein
the separate initial UL BWP specific to the extended device type UE is used for the extended device type UE to transmit uplink messages in PUSCH and hybrid automatic repeat request (HARQ) acknowledgment (HARQ-ACK) feedback during a random access procedure.

55. The radio access method of claim 37, wherein
the separate initial DL BWP specific to the extended device type UE is used for the extended device type UE to receive downlink messages during a random access procedure and to monitor paging information.

56. A user equipment (UE) comprising:
a processor configured to call and run a computer program stored in a memory, to cause a device in which the processor is installed to execute the method of claim 37.

57. A chip, comprising:
a processor, configured to call and run a computer program stored in a memory, to cause a device in which the chip is installed to execute the method of claim 37.

58. A non-transitory computer-readable storage medium, in which a computer program is stored, wherein the computer program causes a computer to execute the method of claim 37.

59. The radio access method of claim 37, wherein the UE capability supported by the extend device type UE has features different from UE capability supported by a legacy UE.

60. The radio access method of claim 37, wherein the connection indication information further includes resource indications of a DL BWP and a UL BWP specific to the extended device type UE after an RRC connection between the extended device type UE and the base station has been established.

61. The radio access method of claim 60, wherein the extended device type UE receives a cell-defining SSB, wherein the cell-defining SSB is transmitted within the DL BWP specific to the extended device type UE.

62. The radio access method of claim 60, wherein the extended device type UE receives a non-cell-defining SSB, wherein the non-cell-defining SSB is transmitted within the DL BWP specific to the extended device type UE.

63. The radio access method of claim 62, wherein the non-cell-defining SSB is used for the extended device type UE to derive a location of the cell-defining SSB.

64. The radio access method of claim 62, wherein the non-cell-defining SSB is used for the extended device type UE to perform measurement in the DL BWP specific to the extended device type UE.

* * * * *